US007272589B1

(12) United States Patent
Guay et al.

(10) Patent No.: US 7,272,589 B1
(45) Date of Patent: Sep. 18, 2007

(54) DATABASE INDEX VALIDATION MECHANISM

(75) Inventors: Todd P. Guay, Nashua, NH (US); Gregory S. Smith, Merrimack, NH (US); Ari W. Mozes, San Carlos, CA (US); Gaylen D. Royal, Bedford, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/703,909

(22) Filed: Nov. 1, 2000

(51) Int. Cl.
*G06F 17/30* (2006.01)
(52) U.S. Cl. .................. 707/2; 707/3; 707/4; 707/5
(58) Field of Classification Search ............. 707/2–5
See application file for complete search history.

(56) References Cited

U.S. PATENT DOCUMENTS

| | | | | |
|---|---|---|---|---|
| 5,404,510 A | * | 4/1995 | Smith et al. ................. | 707/2 |
| 5,915,249 A | * | 6/1999 | Spencer ..................... | 707/5 |
| 5,924,088 A | * | 7/1999 | Jakobsson et al. ........... | 707/2 |
| 5,926,813 A | * | 7/1999 | Chaudhuri et al. .......... | 707/5 |
| 6,003,022 A | * | 12/1999 | Eberhard et al. ............ | 707/2 |
| 6,021,405 A | * | 2/2000 | Celis et al. ................. | 707/2 |
| 6,223,171 B1 | * | 4/2001 | Chaudhuri et al. .......... | 707/2 |
| 6,266,658 B1 | * | 7/2001 | Adya et al. ................. | 707/2 |
| 6,356,891 B1 | * | 3/2002 | Agrawal et al. ............. | 707/2 |
| 6,363,371 B1 | * | 3/2002 | Chaudhuri et al. .......... | 707/2 |
| 6,366,903 B1 | * | 4/2002 | Agrawal et al. ............. | 707/2 |
| 6,370,522 B1 | * | 4/2002 | Agarwal et al. ............. | 707/2 |

OTHER PUBLICATIONS

Surajit Chaudhuri and Kyuseck Shim. "Optimization of Queries with User-Defined Predicates". ACM Transactions on Database Systems vol. 24 No. 2. Jun. 1999. pp. 177-228.*
Michael Siegel, Edward Sciore, and Sharon Salveter. "A Method for Automatic Rule Derivation to Support Semantic Query Optimization". ACM Transactions on Database Systems. vol. 17 No. 4. Dec. 1992. pp. 563-600.*
David Lomet, Roger Barga, Surajit Chaudhuri, and Paul Larson. "The Microsoft Database Research Group". SIGMOD Record, vol. 27, No. 3. Sep. 1998, pp. 81-85.*
Gurry et al. Oracle Performance Tuning. 1996. O'Reilly. Second Edition. pp. 98-104, 138-150, 183-190, 353-356.*
Finkelstein et al., "Physical Database Design for Relational Database", ACM transaction on Database System, vol. 13, No. 1, Mar. 1988, pp. 91-128.*

* cited by examiner

*Primary Examiner*—Khanh B. Pham
(74) *Attorney, Agent, or Firm*—Chapin IP Law, LLC; Barry W. Chapin, Esq.

(57) ABSTRACT

A method evaluates a plurality of candidate index sets for a workload of database statements in a database system by first generating baseline statistics for each statement in the workload. An index superset is formed by combining an existing or current index set and a proposed index set. A candidate index set is derived from the index superset, the candidate index being one of the plurality of candidate index sets. Statistics for a statement are generated by first creating an execution plan which represents an efficient series of steps for executing the statement given the candidate index set. The execution plan is evaluated, and statistics based on the evaluation of the execution plan are generated and recorded. The cost of the execution plan is then determined and statistics are generated. Statistics for each candidate index set are rolled up and presented to a user or an index tuning mechanism.

105 Claims, 24 Drawing Sheets

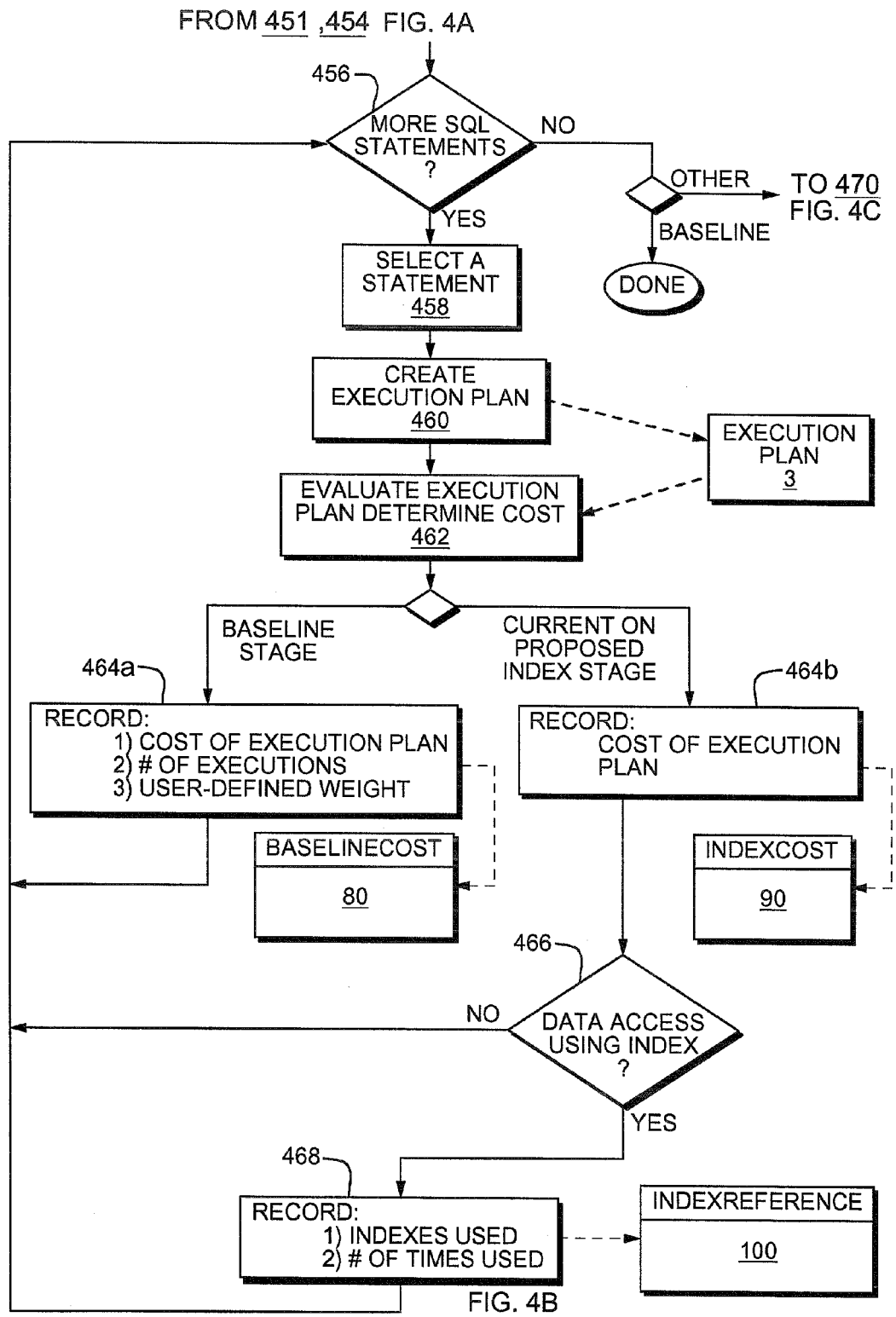

BASELINECOST TABLE

| STMTID 82 | COST 84 | EXECUTIONS 86 | WEIGHT 88 | USAGECOST 89 |
|---|---|---|---|---|
| | | | | |

FIG. 5

INDECOST TABLE

| STMTID 92 | COST 94 | USAGECOST 96 |
|---|---|---|
| | | |

FIG. 6

INDEXREFERENCE TABLE

| STMTID 102 | INDEXNAME 104 | INDEXREFCOUNT 106 |
|---|---|---|
| | | |

FIG. 7

INDEXCOST TABLE

| INDEXNAME 112 | REQUIREDSPACE 114 | VOLATILITY 116 |
|---|---|---|
| | | |

FIG. 8

INDEXREFINEMENT TABLE

| INDEXNAME 122 | USAGEVALUE 124 |
|---|---|
| | |

FIG. 10

| SOLUTIONROLLUP TABLE | | | | | |
|---|---|---|---|---|---|
| SOLUTIONID 132 | COST 134 | SPACEREQUIRED 136 | VOLATILITY 138 | EFFICIENCY 139 | |
| | | | | | |
| | | | | | |

| TABLE1 | | | 600 | |
|---|---|---|---|---|
| COL_1 | COL_2 | COL_3 | COL_4 | COL_5 |
| 601 | 602 | 603 | 604 | 605 |

| TABLE2 | 610 |
|---|---|
| COL_1 | COL_2 |
| 611 | 612 |

| TABLE3 | | 620 |
|---|---|---|
| COL_1 | COL_2 | COL_3 |
| 621 | 622 | 623 |

| TABLE4 | 630 |
|---|---|
| COL_1 | COL_2 |
| 631 | 632 |

WORKLOAD 650

651 /*S1*/ select COL_4 from TABLE1 where COL_2 = 1;

652 /*S2*/ select COL_2, COL_1 from TABLE1 where COL_2 in (1,5,10);

653 /*S3*/ select COL_1 from TABLE1 where COL_2 = 1 and COL_3 = 2
  union all
  select COL_1 from TABLE1 where COL_2 = 3 and COL_3 = 4
  union all
  select COL_1 from TABLE1 where COL_2 = 5;

654 /*S4*/ select COL_1 from TABLE1 where COL_2 = (select COL_2 from TABLE2 where COL_1 = 10);

655 /*S5*/ insert into TABLE1 values (1, 2, 3, 4, 5);

656 /*S6*/ update TABLE2 set COL_1 = 10 where COL_1 = 20;

657 /*S7*/ select COL_3 from TABLE3 where COL_1 = 1;

658 /*S8*/ update TABLE3 set COL_3 = "Oracle Corp" where COL_1<30;

FIG. 15

BASELINECOST TABLE 80

| STMTID 82 | COST 84 | EXECUTIONS 86 | WEIGHT 88 | USAGECOST 89 |
|---|---|---|---|---|
| S1 | 260 | 50 | 1.0 | 13000 |
| S2 | 260 | 10 | 0.5 | 1300 |
| S3 | 780 | 500 | 0.5 | 195000 |
| S4 | 260 | 100 | 0.5 | 13000 |
| S5 | 260 | 10 | 0.25 | 650 |
| S6 | 101 | 40 | 0.25 | 1010 |
| S7 | 147 | 500 | 1.0 | 73500 |
| S8 | 147 | 50 | 1.0 | 7350 |

FIG. 17

IndexCost Table 90

| StmtId 92 | Cost 94 | UsageCost 96 |
|---|---|---|
| S1 | 260 | 13000 |
| S2 | 260 | 1300 |
| S3 | 780 | 195000 |
| S4 | 260 | 13000 |
| S5 | 260 | 650 |
| S6 | 101 | 1010 |
| S7 | 3 | 1500 |
| S8 | 3 | 150 |

Fig. 19

IndexReference Table 100

| StmtId 102 | IndexName 104 | IndexRefCount 106 |
|---|---|---|
| S7 | IDX3_2 | 1 |
| S8 | IDX3_2 | 1 |

Fig. 20

IndexMaintenance Table 110

| Index Name 112 | Required Space 114 | Volatility 116 |
|---|---|---|
| IDX3_1 | 5760 | 0 |
| IDX3_2 | 8320 | 3.97 |

Fig. 21

IndexRefinement Table    120

| IndexName    122 | UsageValue    124 |
|---|---|
| IDX3_1 | 0 |
| IDX3_2 | 22.03 |

Fig. 22

SolutionRollup Table    130

| SolutionId    132 | Cost    134 | RequiredSpace    136 | Volatility 138 | Efficiency    139 |
|---|---|---|---|---|
| current | 225610 | 14080 | 3.97 | 22.03 |

Fig. 23

IndexCost Table 90

| StmtId 92 | Cost 94 | UsageCost 96 |
|---|---|---|
| S1 | 4 | 200 |
| S2 | 3 | 15 |
| S3 | 9 | 2250 |
| S4 | 3 | 150 |
| S5 | 260 | 650 |
| S6 | 3 | 30 |
| S7 | 3 | 1500 |
| S8 | 3 | 150 |

Fig. 25

IndexReference Table 100

| StmtId 102 | IndexName 104 | IndexRefCount 106 |
|---|---|---|
| S1 | IDX1_1 | 1 |
| S2 | IDX1_2 | 1 |
| S3 | IDX1_2 | 3 |
| S4 | IDX1_1 | 1 |
| S4 | IDX1_2 | 1 |
| S6 | IDX2_1 | 1 |
| S7 | IDX3_2 | 1 |
| S8 | IDX3_2 | 1 |

Fig. 26

IndexMaintenance Table 110

| IndexName 112 | RequiredSpace 114 | Volatility 116 |
|---|---|---|
| IDX1_1 | 5760 | 0.79 |
| IDX1_2 | 9344 | 0.79 |
| IDX2_1 | 5760 | 3.17 |
| IDX2_2 | 5760 | 0 |
| IDX3_1 | 5760 | 0 |
| IDX3_2 | 8320 | 3.97 |

Fig. 27

Index Refinement Table 120

| IndexName 122 | UsageValue 124 |
|---|---|
| IDX1_1 | 3.14 |
| IDX1_2 | 66.91 |
| IDX2_1 | 1.23 |
| IDX2_2 | 0 |
| IDX3_1 | 0 |
| IDX3_2 | 22.03 |

Fig. 28

SolutionRollup Table 130

| SolutionId 132 | Cost 134 | RequiredSpace 136 | Volatility 138 | Efficiency 139 |
|---|---|---|---|---|
| current | 225610 | 14080 | 3.97 | 22.03 |
| Solution1 | 4945 | 40704 | 7.9 | 90.5 |

Fig. 29

DATABASE INDEX VALIDATION MECHANISM

BACKGROUND

Indexes are optional structures associated with database tables which exist primarily to enhance Structured Query Language (SQL) performance. Understanding and using indexes is important when optimizing SQL, because effective indexing can result in significant performance improvements in data retrieval.

The advantages of indexes do not come without a cost. Creating an index can be time consuming. In addition, indexes must be updated as the indexed table is modified by insertion or deletion of rows, or when an indexed table column is updated. As a result, indexes can degrade the performance of these operations. Furthermore, indexes consume additional disk space beyond that needed for the database.

Index tuning is the process of identifying an optimal set of indexes for each table in a database, given a set of SQL statements that are executed on the table, the properties of the table, and any restrictions imposed by the underlying database environment such as available disk space to create new indexes. Once a candidate set of indexes for the target table has been identified, it must be verified that the proposed solution is better than the current indexes created on the table.

This verification, however, involves changing the existing indexes to those of the proposed solution, and confirming that the optimizer uses the new indexes as expected and that no part of the workload is degraded in performance as a result of the index changes.

Prior to the present invention, the verification process was typically performed by having an individual responsible for database administration, e.g., a database administrator (DBA), manually change or modify the indexes. A development database might be utilized during the verification process, to minimize any risks to the production database. A development database is a mirror copy of the production database and is used to test changes to the production database actual implementation. A primary advantage of using a development database is that risk is reduced, since the production database is not modified until the change has been confirmed on the development database. Major disadvantages of using a development database environment are that resources are required to maintain it, and that the DBA must ensure the development database accurately reflects the production database.

Verification typically involves running the set of SQL statements for the table, identifying any statements whose performance has degraded, performing a detailed evaluation to determine the cause of the degradation, and adjusting the index solution to resolve the degradation.

If a development database is not used, the verification is performed directly on the production database by making the recommended index changes and monitoring the production database for any problems that have been introduced.

SUMMARY

Indexing decisions are important and can be complex. Merely indexing everything is most likely not the best approach. Yet in order to achieve acceptable performance, indexes are generally used for databases. A solution is to index selectively, creating indexes only when the benefit outweighs the cost.

Given a workload, a current index set and a proposed index set, a Database Index Verification Mechanism can assist the user in determining which indexes should be created or modified to improve performance as well as identifying indexes that could be removed without degrading performance and without disabling an integrity constraint.

Therefore, an embodiment of the present invention can include a method and system that evaluates a plurality of candidate index sets for a workload of database statements in a database system by first generating baseline statistics for each statement in the workload. The workload can be reduced or collapsed into unique statements, and the statements can be SQL statements. An index superset can then be formed from a union of an existing or current index set and a proposed index set. The proposed index set may be provided, for example, by a user, or by an expert system. A candidate index set can be derived from the index superset, the candidate index being one of the plurality of candidate index sets. Selection of an index set may additionally be based on criteria which may include, but are not limited to, a cost value, a maximum number of allowed indexes and available storage space. Statistics can be generated based on the candidate index set and the baseline statistics, and presented along with statistics for the baseline and for the current index set, to a user or to an index tuning mechanism, for example.

The process of deriving a candidate index set and generating statistics based on the proposed index set can be executed repeatedly until at least one candidate index solution is found that adheres to user-imposed constraints and no further indexes can be removed from said candidate index solution without degrading performance of the workload. Furthermore, the current indexes can be disabled in order to establish the baseline. New candidate index solutions can be generated by eliminating at least one index within the candidate index solution that does not adhere to user-imposed constraints, which may be user-defined, such as a memory-usage constraint. In addition, new candidate index solutions can be generated by eliminating at least one index on a small table under evaluation if the index does not enforce an integrity constraint.

The statistics for a statement can be generated by first creating an execution plan that represents a series of steps to be taken by an optimizer in executing the statement. The statistics can include, but are not limited to, the number of executions of the statement, a user-defined weight of the statement, an index usage or a cost of the execution plan. The execution plan can then be evaluated, and statistics based on the evaluation of the execution plan can be generated and recorded. The execution plan may be created without creating an index.

When determining the execution plan for a statement, the database's optimizer can examine available access paths, as well as statistics for the objects, such as tables or indexes, accessed by the statement. Evaluation of such an execution plan can include, for a table accessed by a statement under evaluation, identifying at least one index that would be used to retrieve data from the table upon an execution of the statement. Evaluation of such an execution plan can also include determining the cost of the execution plan. For example, the cost of the execution plan can be derived from the resource usage, such as CPU execution time or input/output access, required to execute the statement according to the execution plan.

BRIEF DESCRIPTION OF THE DRAWINGS

The foregoing and other objects, features and advantages of the invention will be apparent from the following more particular description of a Database Index Validation Mechanism, as illustrated in the accompanying drawings in which like reference characters refer to the same parts throughout the different views. The drawings are not necessarily to scale, emphasis instead being placed upon illustrating the principles of the invention.

FIGS. 4A-4C are a flowchart illustrating the steps performed by the workload evaluator of FIGS. 3A-3C.

FIG. 5 is a schematic diagram illustrating a BaselineCost table as used by a particular Database Index Validation Mechanism.

FIG. 6 is a schematic diagram illustrating a IndexCost table as used by a particular Database Index Validation Mechanism.

FIG. 7 is a schematic diagram illustrating an IndexReference table as used by a particular Database Index Validation Mechanism.

FIG. 8 is a schematic diagram illustrating an IndexMaintenance table as used by a particular Database Index Validation Mechanism.

FIG. 10 is a schematic diagram illustrating an IndexRefinement table as used by the index evaluator of FIGS. 2 and 3 in a particular Database Index Validation Mechanism.

FIG. 12 is a schematic diagram illustrating a SolutionRollup table as used by a particular Database Index Validation Mechansim.

FIG. 15 is a diagram of a sample workload to be evaluated for the example of FIG. 14.

FIG. 17 is a schematic diagram illustrating how the BaselineCost table of FIG. 5 is populated for each workload statement of FIG. 15 and as a result of the evaluation of FIG. 16.

FIG. 19 is a schematic diagram illustrating how the IndexCost table of FIG. 6 is populated as a result of the evaluation of FIG. 18.

FIG. 20 is a schematic diagram illustrating the population of the IndexReference table of FIG. 7 as a result of the evaluation of FIG. 18.

FIG. 21 is a schematic diagram illustrating the population of the IndexMaintenance table of FIG. 8 as a result of the evaluation of FIG. 18.

FIG. 22 is a schematic diagram illustrating how the IndexRefinement table of FIG. 10 is populated by the index evaluator of FIG. 3C as a result of the population of the IndexCost, IndexReference and IndexMaintenance tables as shown in FIGS. 19-21 respectively.

FIG. 23 is a schematic diagram illustrating how the SollutionRollup table of FIG. 12 is populated by the solution rollup evaluator of FIG. 3C as a result of the population of the IndexRefinement table as shown in FIG. 22.

FIGS. 25-27 are schematic diagrams illustrating how the IndexCost table, the IndexReference table, and the IndexMaintenance table are populated as a result of the new proposed index solution.

FIG. 28 is a schematic diagram illustrating the population of the IndexRefinement table for the example of FIG. 14.

FIG. 29 is a schematic diagram illustrating the population of the SolutionRollup table.

DETAILED DESCRIPTION

Figure 1:
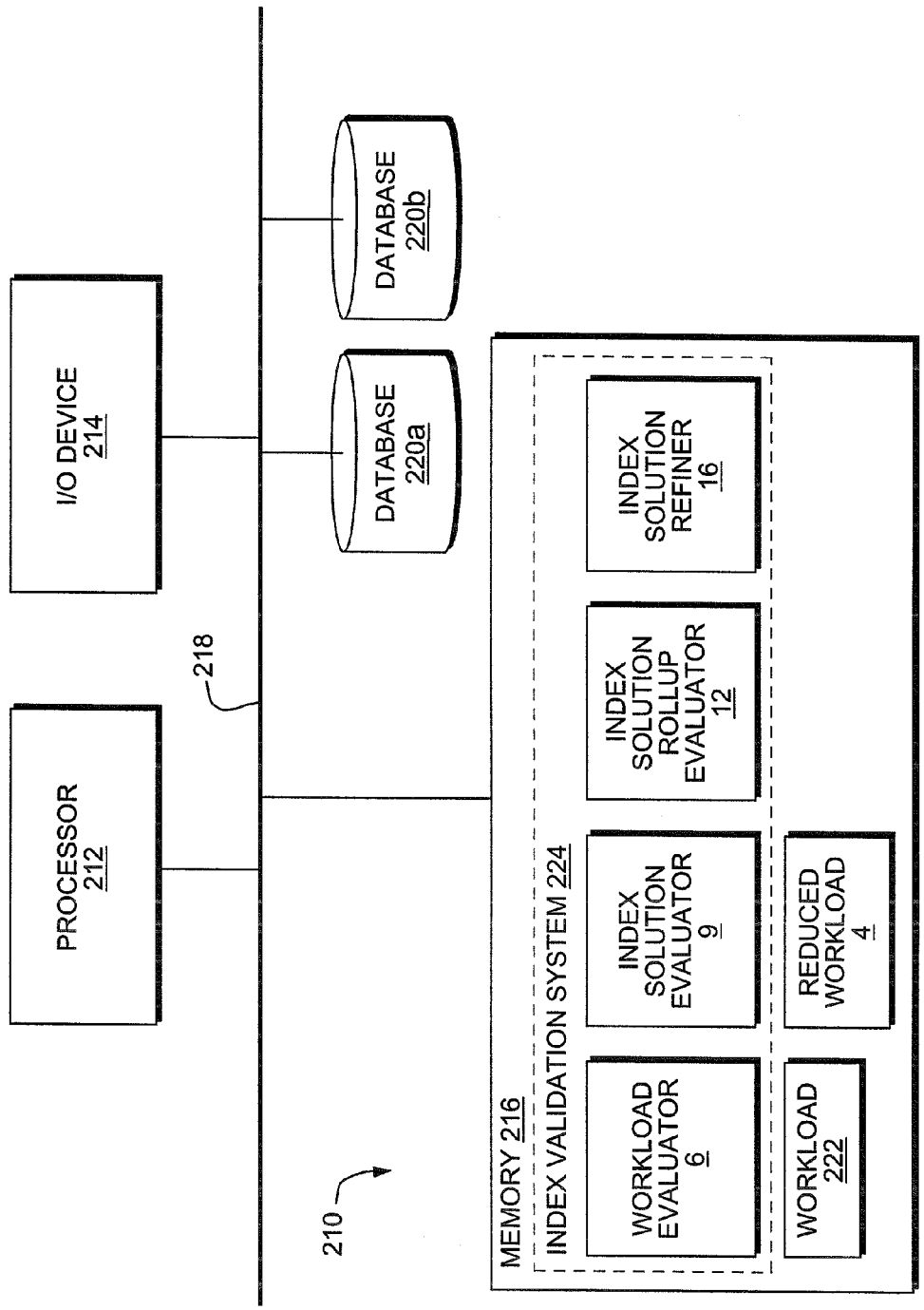
FIG. 1 is a schematic illustration of a database management system embodying a database index validation mechanism for index tuning.

FIG. 1 is a schematic illustration of a database management system 210 embodying a database index validation mechanism for index tuning. The database management system 210 is shown to include a processor 212, an I/O device 214 and a system memory 216 connected by a system bus 218. Here the database is shown stored locally on storage disks 220A and 220B. It should be understood however, that the database can also be stored remotely on one or more devices (not shown).

System memory 216 is shown to include a database workload 222 and a reduced workload 4. The database workload 222 can reside in memory 216 as shown, within the database, or in any other secondary storage. Typically, a database workload 222 includes all database statements submitted to a database over a specified period of time. Several workload collection mechanisms can exist, three of which are discussed below.

A first mechanism filters application code, searching the source code for all database statements. A second mechanism introduces either a software or hardware collection process to the database environment between an application and the database. The process reads database statements as they are submitted to the database for processing and writes the statements to memory.

A third collection mechanism uses a database cache. Some database systems maintain an internal cache of frequently accessed database statements which have run against the database. This cache is typically used to share database statements between different users to save processing time. Since the shared database statements do not have to be reparsed, however, the cache may also be used to collect workload information. For ease of explanation and clarity of description, the remainder of the description assumes that the database workload is provided by a database cache capturing SQL statements.

System memory 216 is further shown to include an index validation system 224, which operates on a database workload 222 or a reduced workload 4. The index validation system 224 includes a workload evaluator 6, an index solution evaluator 9, and index solution rollup evaluator 12 and an index refiner 16.

In one embodiment, the workload evaluator 6 evaluates the reduced workload 4 for a first set of indexes for the workload. The index solution evaluator 9 determines a "value" for each index in the given index set. The solution rollup evaluator 12 rolls up the workload evaluation, providing a single cost metric for the first index solution. Finally, the index refiner 16 creates a new candidate index solution by removing one or more indexes from the first solution. This new candidate index solution can be fed back through the index validation system.

The database workload 222 includes all SQL statements submitted to the database over a period of time. Typically, not all SQL statements included in the database workload are of interest to the index validation system 224. For example, many of the statements may define or modify the structure of the database or address the security for the database. These types of SQL statements generally do not address data retrieval efforts and are therefore not relevant to the index validation system 224. Therefore, providing the complete database workload 222 to the index validation system may be inefficient and wasteful of processing resources.

Accordingly, a workload preprocessor (not shown), described in U.S. Ser. No. 09/398,616, filed Sep. 17, 1999, incorporated herein by reference, reduces a workload of a database system, such that the index validation system 224 can operate more efficiently. In addition, duplicate statements can be deleted, since evaluating the same statement several times would be wasteful. The result is a "reduced workload" 4.

The term "workload" is generally used below to refer to a reduced workload 4, although it should be recognized that a full workload 222 could also be employed.

Figure 2:
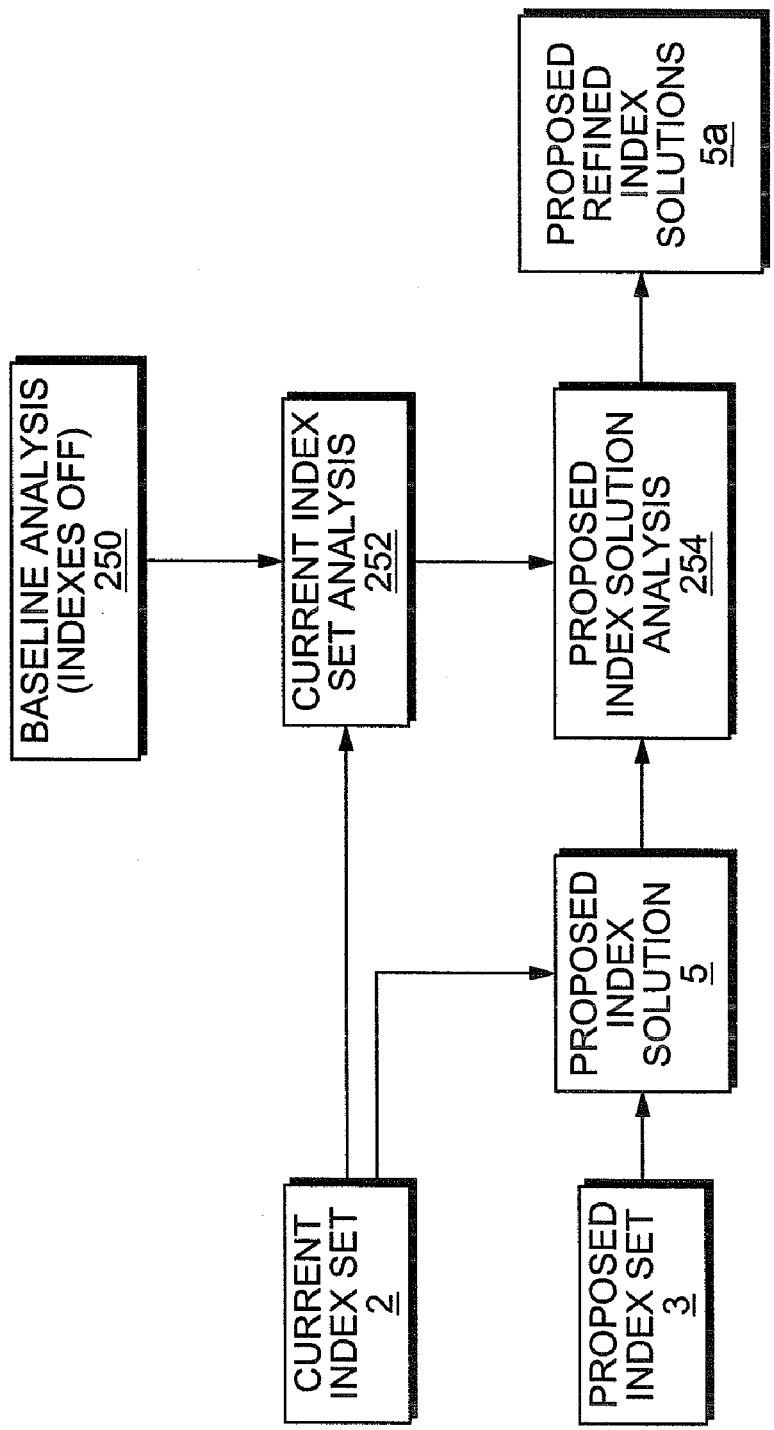
FIG. 2 is a schematic diagram illustrating the three stages of a particular database index validation mechanism.

FIG. 2 is a schematic diagram illustrating the three stages of a particular database index validation mechanism.

First, in the baseline stage 250, analysis is performed with all indexes off, except for those indexes that enforce constraints.

Next, a current index set analysis 252 is performed on the current index set 2, i.e., the set of indexes which have already been created for the database.

Finally, a proposed index set 3 is merged at 256 with the current index set 2 to form a "proposed index solution" 5, and a proposed index solution analysis 254 is performed, taking into account the results of the baseline analysis 250 and the current index set analysis 252. The result of the proposed index solution analysis 254 is a set of proposed refined index solutions 5A.

Figure 3A:
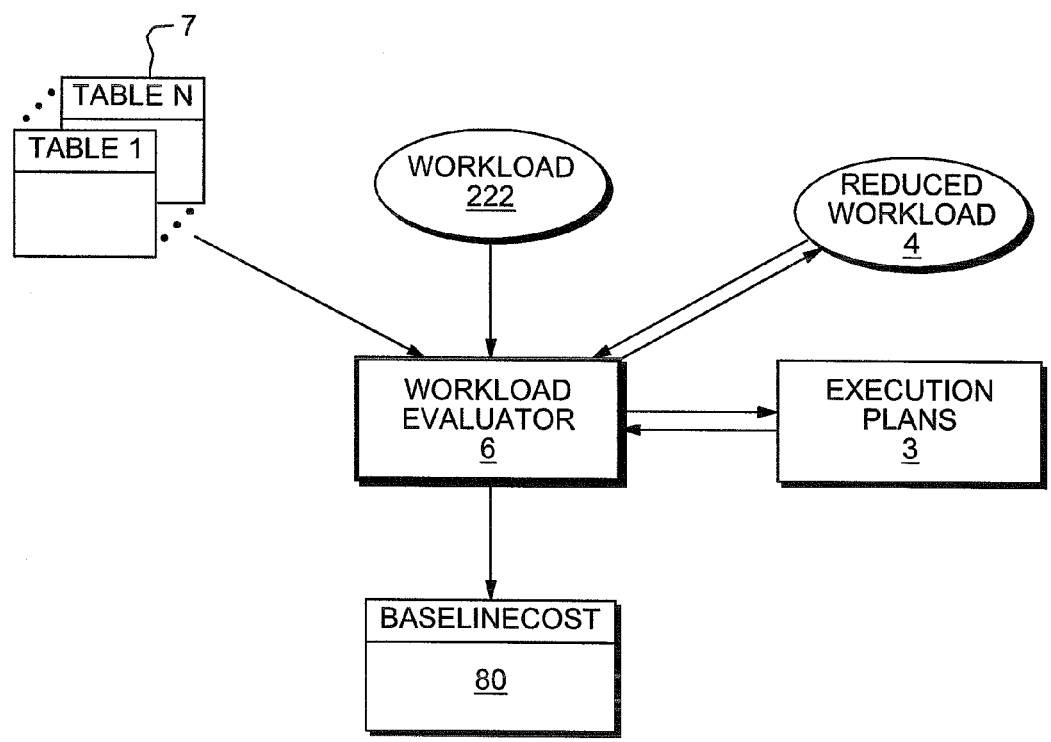
FIG. 3A is a schematic diagram illustrating a high level overview of the baseline analysis stage of FIG. 2, in which a baseline cost is determined.

FIG. 3A is a schematic diagram illustrating a high level overview of the baseline analysis stage 250 of FIG. 2, in which a baseline cost is determined. The baseline analysis stage 250 records the performance of the workload 4 assuming that no indexes exist other than indexes that enforce integrity constraints. Thus, the current set of indexes on the tables under evaluation 7, excluding indexes which enforce integrity constraints, are disabled.

The current SQL workload 4 being executed against the tables 7 is fed into a workload evaluator 6. The workload evaluator 6 determines the cost of execution plans 10 for the individual statements of the workload 4 assuming that no indexes are available. This information is saved in a Baseline Cost table 80 for future comparisons in order to determine a proposed index's "value" and thus serves as a baseline.

An execution plan is a description of the combination of steps to be performed by the database server to execute a SQL statement, such as SELECT, INSERT, UPDATE or DELETE. An execution plan includes an access method for each table to be accessed by the SQL statement, as well as an ordering of the tables, i.e., the join order. The "cost" of an execution plan is an estimated value which is proportional to the expected resource usage needed to execute the SQL statement with this execution plan. See, for example, "Oracle7 Server Concepts," Chapter 13 ("The Optimizer"), Oracle Corporation, 1995, incorporated herein by reference.

Figure 3B:
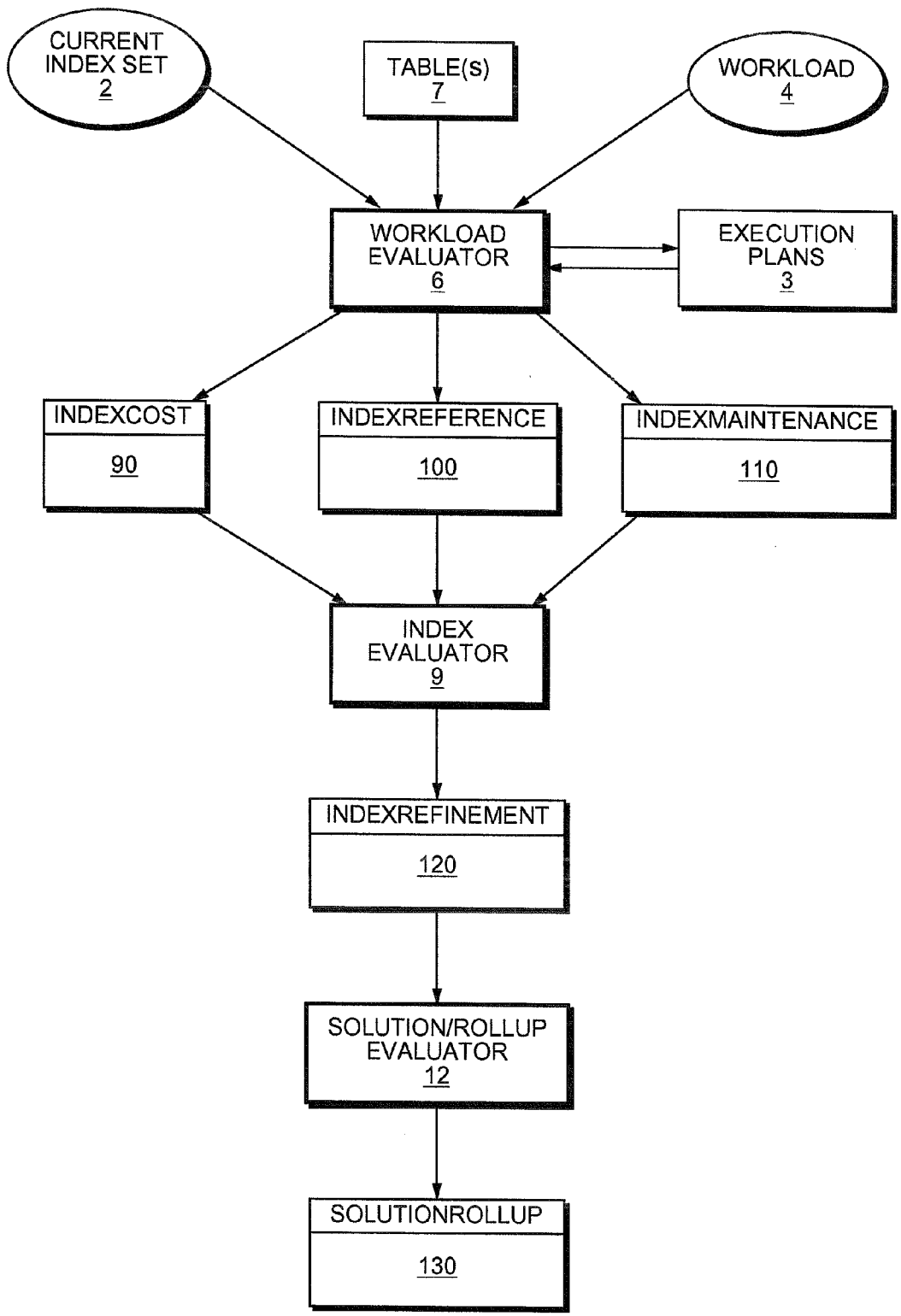
FIG. 3B is a block diagram illustrating a high level overview of the current index set analysis stage of FIG. 2.

FIG. 3B is a block diagram illustrating a high level overview of the current index set analysis stage 252 of FIG. 2.

Once the baseline costs have been determined, the current set of indexes 2 on the tables under evaluation 7, as well as the SQL workload 4 being executed against the tables 7, are fed into the workload evaluator 6. The workload evaluator 6 determines the impact of the current index set 2 on the individual SQL workload statements 4. The cost of execution plans for the individual statements are recorded in the IndexCost table 90, while other relevant data are recorded in the IndexReference and IndexMaintenance tables, 100 and 110 respectively, as described in more detail below.

The index evaluator 9 determines a "value" for each individual index within the current index solution 2, and records the value in the IndexRefinement table 120.

These values are rolled up by the solution rollup evaluator 12 to determine the "efficiency" 14 of the current index solution 2, which is recorded in the SolutionRollup table 130.

Figure 3C:
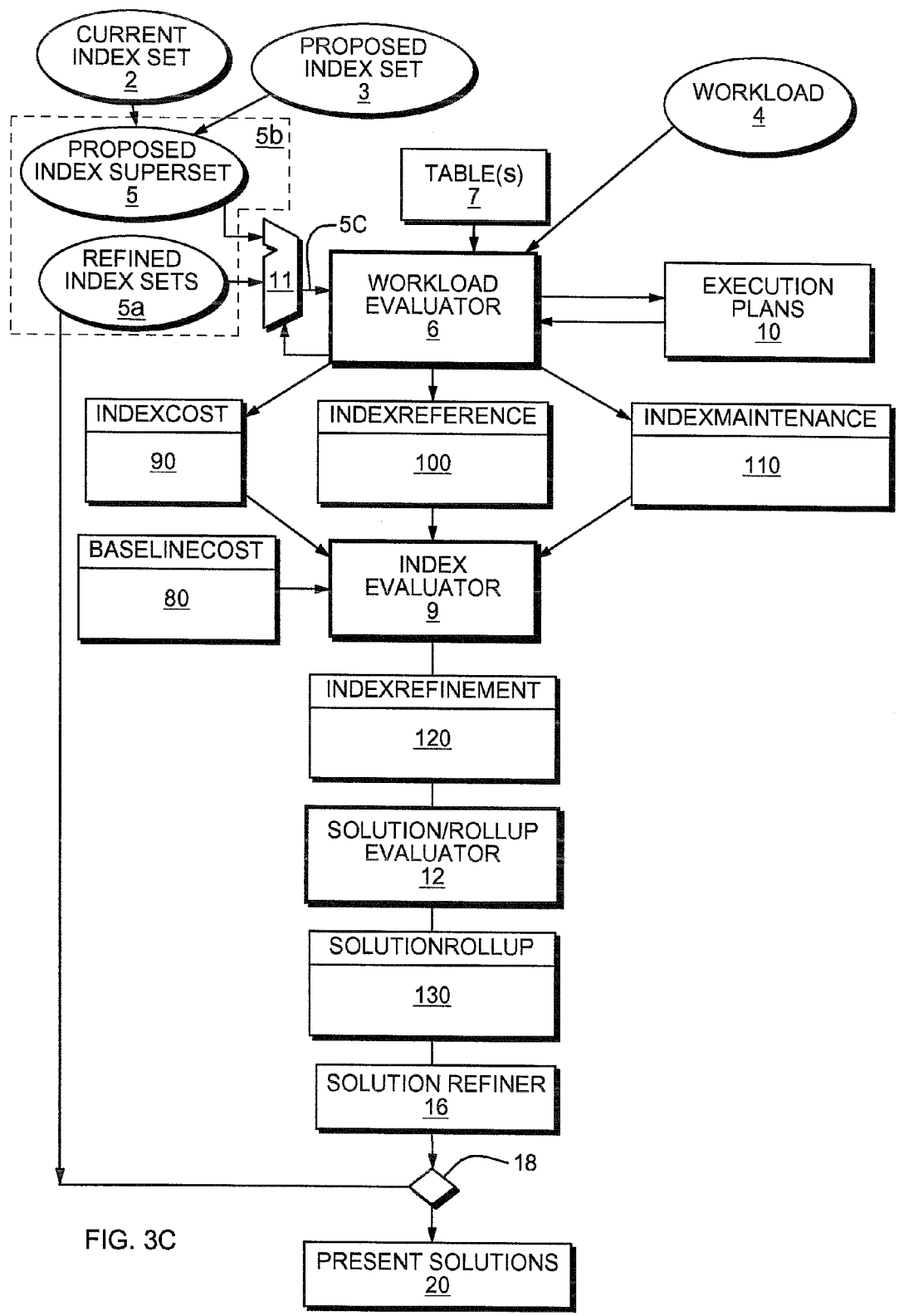
FIG. 3C is a schematic diagram illustrating a high level overview of the proposed index solution analysis stage of FIG. 2.

FIG. 3C is a schematic diagram illustrating a high level overview of the proposed index solution analysis stage 254 of FIG. 2. Once the efficiency of the current index solution 2 has been determined and stored in the SolutionRollup table 130, a new set of indexes 3 is proposed by, for example, a user or a special tool that generates index recommendations. This proposed index set 3 is added to, or unioned with, the current index set 2 to form a proposed index superset 5. In one embodiment, the proposed indexes are evaluated by the optimizer as part of verification, but do not physically use space, nor are they visible to the optimizer outside of the verification process.

The workload evaluator 6 now determines the impact of the proposed index superset 5 by evaluating index usage for each SQL workload statement executing against the tables 7. A selector 11, which is part of the workload evaluator, selects a candidate index solution 5C from a proposed index solution set 5B.

As in the current index analysis stage of FIG. 3B, the index evaluator 9 determines the "value" each index provides, based on the data collected and stored in the BaselineCost table 80, the IndexCost table 90, the IndexReference table 100 and the IndexMaintenance table 110. This data is rolled up by the solution rollup evaluator 12 to determine the efficiency of the proposed index superset 5.

The solution refiner 16 refines the proposed index superset 5 by generating one or more refined index sets 5A that are subsets of the originally proposed index superset 5. Each of these refined index sets 5A is then fed back to the workload evaluator 6 and the cycle continues until one of two conditions is true, as determined at 18. Together, the proposed index superset 5 and the refined index supersets 5A are considered "proposed index solutions" 5B.

One condition is that at least one index solution that adheres to user-imposed constraints exist and that no further indexes can be removed without degrading the performance of the SQL workload or disabling an integrity constraint.

The alternate condition that terminates the cycle is that all possible index solutions have been exhausted and none adhere to user-imposed constraints.

Once all viable index solutions have been analyzed, the index verification mechanism presents the individual index solutions at 20, ordered by their "efficiency," to either the end user or an index tuning tool, for determining which index solution to implement. Further details are described below.

Workload Evaluator

Figure 4A:
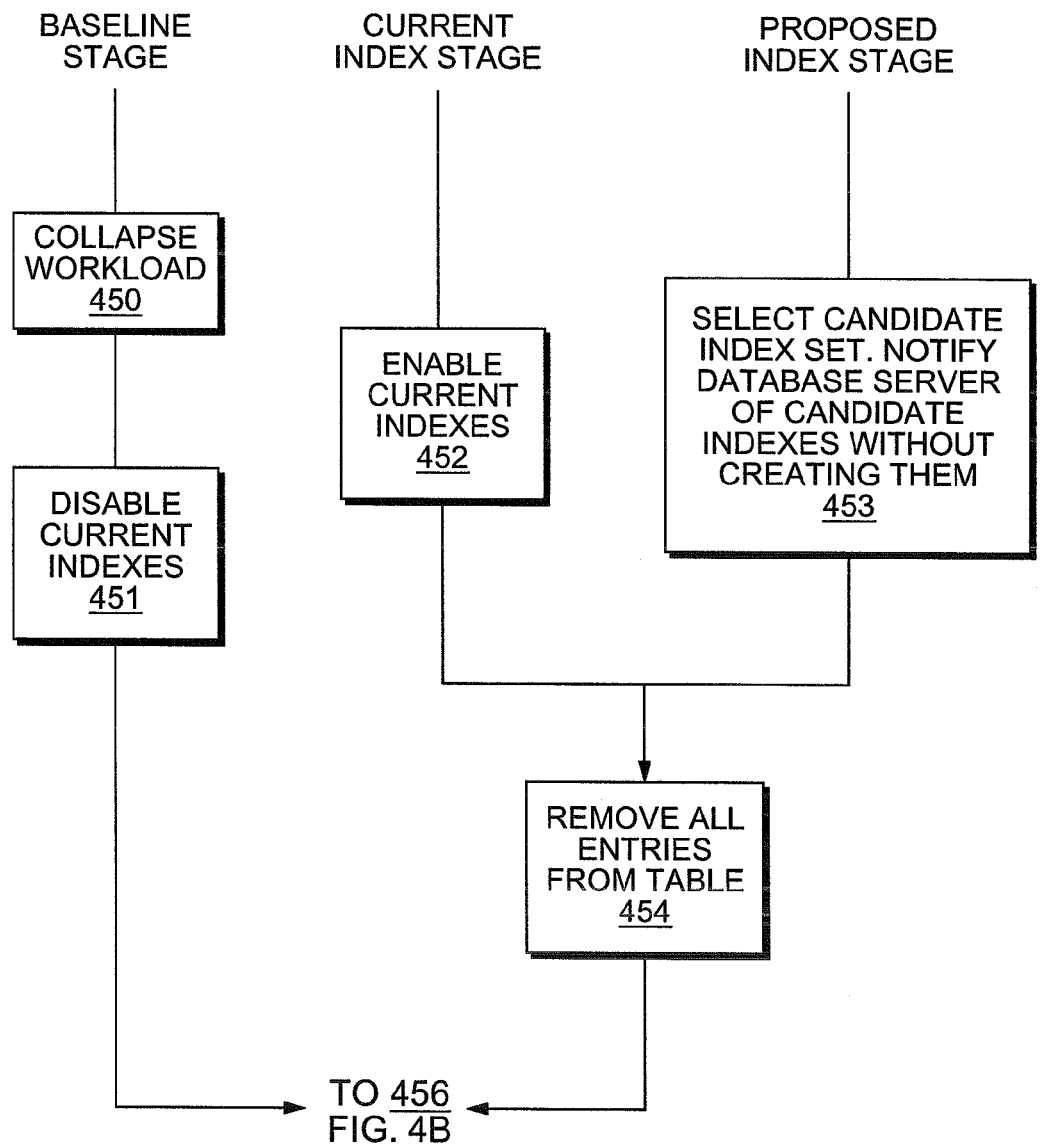
Figure 4C:
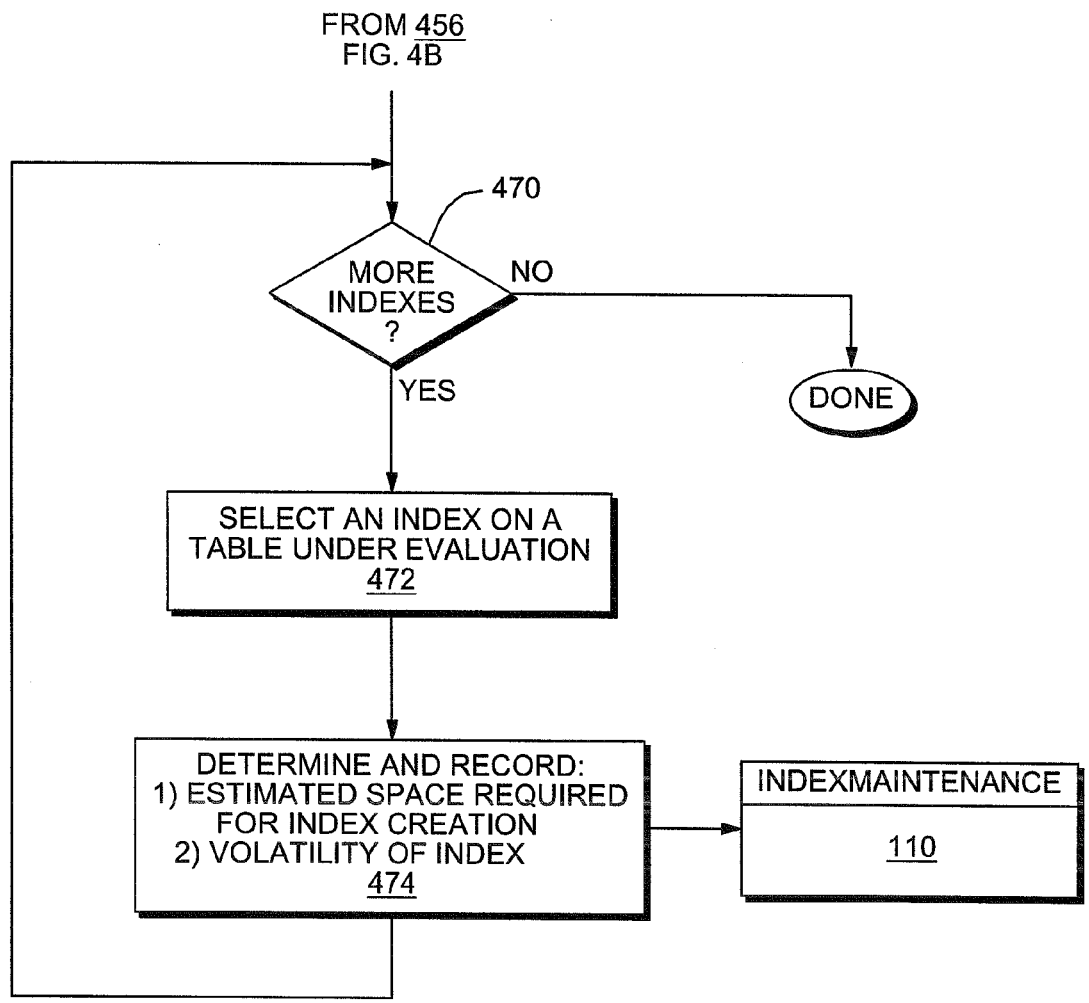

FIGS. 4A-4C are a flowchart illustrating the steps performed by the workload evaluator 6 of FIGS. 3A-3C.

The primary goal of the workload evaluator 6 is to quantify the impact of a proposed solution 5, 5A, i.e., a set of indexes, on the individual SQL statements of the workload 4.

If the baseline is being generated, then first, in step 450, the workload 222 is collapsed, or reduced to unique SQL statements, i.e., a reduced workload 4, for example by deleting all duplicated statements and statements which do not manipulate data. As stated earlier, in one embodiment, this step is performed by a preprocessor.

Next, step 451 is executed, and any currently existing indexes 2 that do not enforce an integrity constraint are disabled. One method for accomplishing this is to modify the unique SQL statements associated with the tables under evaluation 7 by adding a hint that instructs the database server to ignore the specified index.

If, on the other hand, a current index set is being evaluated, the indexes are enabled at step 452.

Finally, if a proposed index solution 5B is being tested, then step 453 is executed, and a candidate index solution is selected from the proposed index solution 5B. The database server is then notified of the proposed indexes without actually creating them. One method for accomplishing this is to add a capability in the database server to allow a user to specify one or more index definitions of which the database server will be aware when generating an execution plan without requiring that the index actually exist.

Whether a current index set or a proposed index solution is being analyzed, tables 90, 100 and 110 are cleared, that is, all entries are removed (step 454).

For each unique SQL statement in the workload 4, the loop comprising steps 456-468 is executed. Step 456 determines whether there are any workload statements remaining to be analyzed.

If there are remaining statements, then in step 458, one of the remaining statements is selected. In step 460, an execution plan 10 is created based on available access paths and statistics for schema objects accessed by the selected SQL statement, i.e., tables and/or indexes. An optimizer (not shown) can generate the set of execution plans 3 for each workload statement based on available access paths and hints. This execution plan represents a series of steps used by the optimizer for executing the SQL statement.

In step 462, the execution plan 10 is evaluated. In the current index analysis stage 252, this includes identifying the index or indexes used to access rows of data from the database. The cost of the execution plan is then determined and stored in the BaselineCost table 80 for the baseline analysis stage 250 or the IndexCost table 90 for the current index or proposed index solution stages, 252, 254 respectively. The optimizer estimates the cost of each execution plan based on the data distribution and storage characteristics statistics for the tables and indexes, and any other objects in a data dictionary.

The "cost" is an estimated value proportional to the expected resource use needed to execute the statement using the execution plan. The optimizer calculates the cost based on the estimated computer resources, including but not limited to I/O, CPU time and memory, that are required to execute the statement using the plan.

The workload evaluator 4 records the determined cost of the execution plan. If the baseline is being generated, the cost is recorded in the BaselineCost table 80 (step 464A). If a current index set or proposed index solution is being tested, the cost is recorded in the IndexCost table 90 (step 464B). These tables are described in more detail below.

In addition, if the baseline is being generated, the number of executions of each SQL statement and user-defined weight of the SQL statement are also recorded. In one embodiment, this information is stored in the BaselineCost table 80. Note that the number of executions and the user-defined weight for a given SQL statement remains constant. Thus, in one embodiment, this information is recorded just once during the baseline stage 250.

For baseline analysis, the loop is complete, and control returns to step 456. If there are no more SQL statements to analyze, the workload evaluator 6 is finished.

Otherwise, at step 466, a determination is made as to whether the execution plan involves data access using any of the indexes being evaluated. If so, step 468 is executed, and the index or indexes used in the execution plan are recorded in the IndexReference table 100, along with the number of times each index was used in the execution plan.

In the current index set stage 252 or the proposed index solution stage 254, when there are no more SQL statements to process at step 456, steps 470-474 are executed for each index on the table or tables under evaluation 7. At step 472, an index is selected. At step 474, the estimated space required for index creation and the "volatility" of the index are determined and recorded in the IndexMaintenance table 110.

The various tables used in a particular embodiment of the present invention are now described. However, it would be understood by one skilled in the art that other table compositions or storage means are equally valid.

FIG. 5 is a schematic diagram illustrating the BaselineCost table 80 as used by a particular database index validating mechanism. The table 80 comprises five fields: StmtId 82, Cost 84, Executions 86, Weight 88 and UsageCost 89. For each row in the table 80, the StmtId field 82 holds an identifier which uniquely identifies a SQL statement. The Cost field 84 holds the cost of the execution plan for this SQL statement, as determined in step 462 and recorded in step 464A of FIG. 4.

The Executions field 86 holds the number of times the corresponding SQL statement is to be executed according to the workload 4.

The Weight field 88 holds a user-defined indicator of importance of this SQL statement relative to other statements in the workload 4. This allows a user to optimize the performance of his business's most important workload statements. In one embodiment, the weight defaults to 1, but can be changed to any value greater than 0.

The UsageCost field 89 holds the "usage cost" for the identified statement. This is calculated as $$\text{UsageCost} = C_{baseline} * X * W \tag{Eq. 1A}$$

where $C_{baseline}$ is the execution plan cost (field 84), X is the number of executions (field 86) and W is the weight (field 88).

FIG. 6 is a schematic diagram illustrating the IndexCost table 90 as used by a particular Database Index Validation Mechanism. This table 90 is similar to the BaselineCost table 80 of FIG. 5, but is used to store non-baseline information, and comprises only three fields: StmtId 92, Cost 94 and UsageCost 96. As discussed previously, Executions and Weight fields are not required because this information is constant and is already stored in the BaselineCost table 80.

For each row in the IndexCost table 90, the StmtId field 92 holds an identifier which uniquely identifies a SQL statement. The Cost field 94 holds the cost of the execution plan for the identified SQL statement, determined in step 462 of FIG. 4.

The UsageCost field 96 holds the calculated cost for the identified statement. This is calculated as $$\text{UsageCost} = C_{index} * X * W \qquad \text{(Eq. 1B)}$$

where $C_{index}$ is the cost, from field 94, X is the number of executions, from field 86 of the BaselineCost table 80 and W is the weight, from field 88 of the BaselineCost table 80.

Referring again to FIG. 4, if the execution plan involves accessing data with one or more indexes, as determined in step 466, the index(es) used in the execution plan are recorded, in step 468, in the table IndexReference table 100. The number of times each index is referenced in the execution plan is also recorded.

FIG. 7 is a schematic diagram illustrating an IndexReference table 100 as used by a particular index validation mechanism, comprising three fields: StmtId 102, IndexName 104 and IndexRefCount 106. The StmtId field 102 holds an identifier which uniquely identifies a SQL statement. The IndexName field 104 holds the name of an index used as an access method in the execution plan for the identified SQL statement. The IndexRefCount 106 field holds the number of times this index is used in the execution plan for this SQL statement.

FIG. 8 is a schematic diagram illustrating an IndexMaintenance table 110 as used by a particular index validation mechanism. This table 110 comprises three fields: IndexName 112, RequiredSpace 114 and Volatility 116. The IndexName field 112 holds the name of an index. The RequiredSpace field 114 field holds the estimated number of kilobytes required to create named index. The Volatility field 116 holds the percentage of the workload that results in this index having to be updated. An index must be updated for each row inserted into the indexed table, each row deleted from the indexed table, and for each row that is updated in the indexed table where the indexed column is update. The volatility V is calculated as:

$$\text{Volatility} = 100 * \frac{P}{Q} \qquad \text{(Eq. 2)}$$

where P is the number of executions of the statement that result in an update to the index, and Q is the total number of executions of all statements.

Index Evaluator

The index evaluator 9 determines an index's "value" in the proposed index solution using the data stored by the workload evaluator 6 in the BaselineCost 80, IndexCost 90, IndexReference 100 and IndexMaintenance 110 tables. This value is used by the solution refiner 16 to identify indexes that can be removed without substantially degrading performance.

Figure 9:
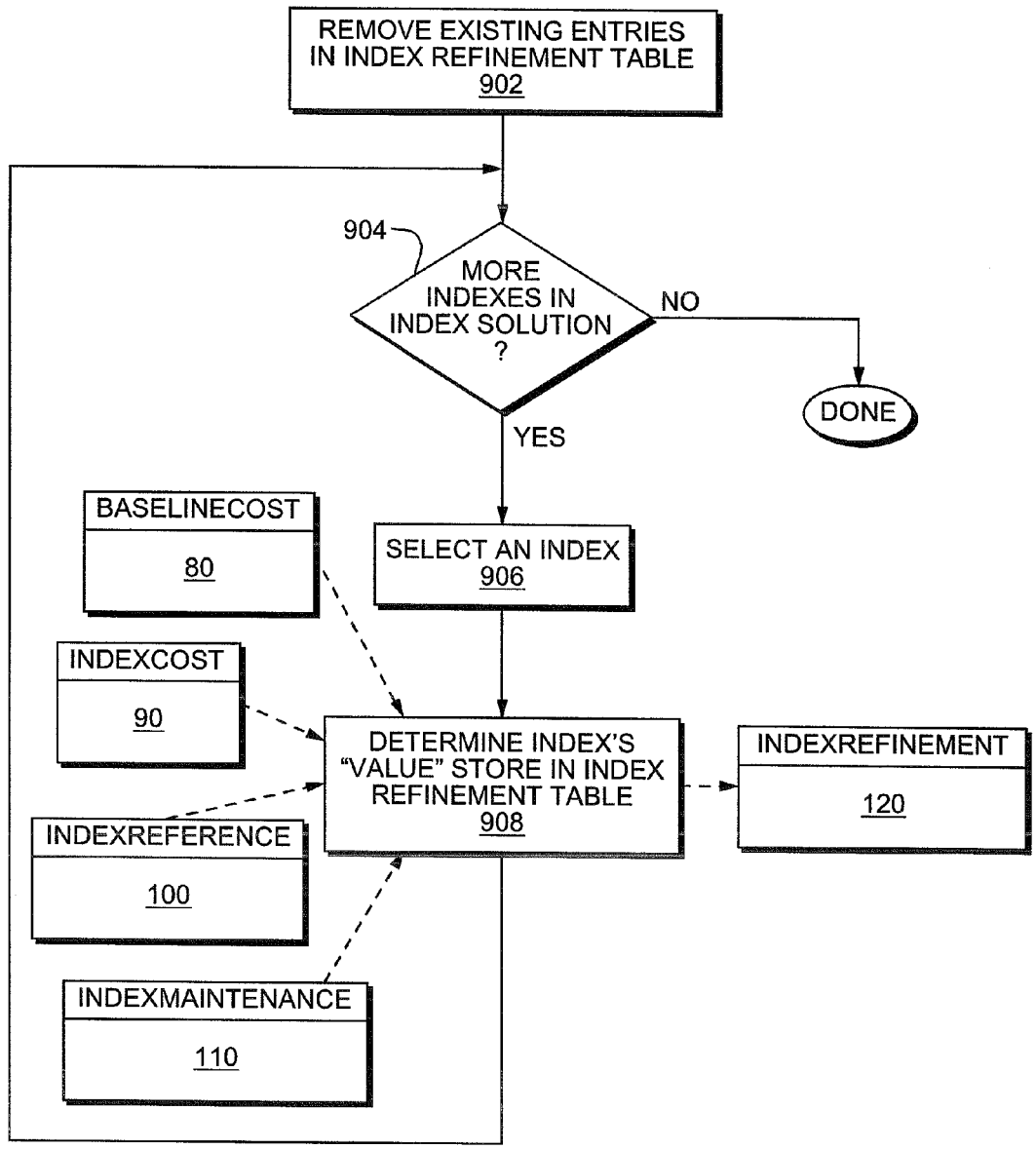
FIG. 9 is a flowchart illustrating the operation of the index evaluator of FIGS. 3B and 3C.

FIG. 9 is a flowchart illustrating the operation of the index evaluator 9 of FIGS. 3B and 3C. In step 902, all existing entries in the IndexRefinement table 120, described below with respect to FIG. 10, are removed.

Step 904 determines whether there are any unprocessed indexes in the candidate index solution 5C. If not, the index evaluator is finished. Otherwise, at step 906, an index from the candidate index solution 5C is selected. In step 908, a "value" is determined for the selected index and stored in the IndexRefinement table 120. Step 908 is described in detail below with respect to FIGS. 10 and 11.

FIG. 10 is a schematic diagram illustrating the IndexRefinement table 120 as used by a particular index validation mechanism. The IndexRefinement table 120 comprises two fields: IndexName 122 and UsageValue 124.

The IndexName field 122 holds the name of an index.

The UsageValue field 124 holds a "usage value" which is calculated for the named index. The value is 0 if the IndexRefCount field 106 of the IndexReference table 100 for this index is 0. Otherwise, the UsageValue is either 0 or "usagevalue," whichever is greater, where $$\text{usagevalue} = K * \left(1 - \frac{CR}{TC}\right) * 100 - L * V \qquad \text{(Eq. 3)}$$

Here, K and L are user-defined constants which allow the user to indicate an importance factor for favoring data retrieval for frequently executed statements (high K) or minimal volatility (high L). In one embodiment, these constants, K and L, are defined once for the entire index solution refinement phase, and must be greater than or equal to 0.

CR, the cost reduction due to the index, represents the percentage of "data retrieval improvement" over the baseline that is a result of the index. Data retrieval improvement is indicated through a lower execution plan cost.

Figure 11:
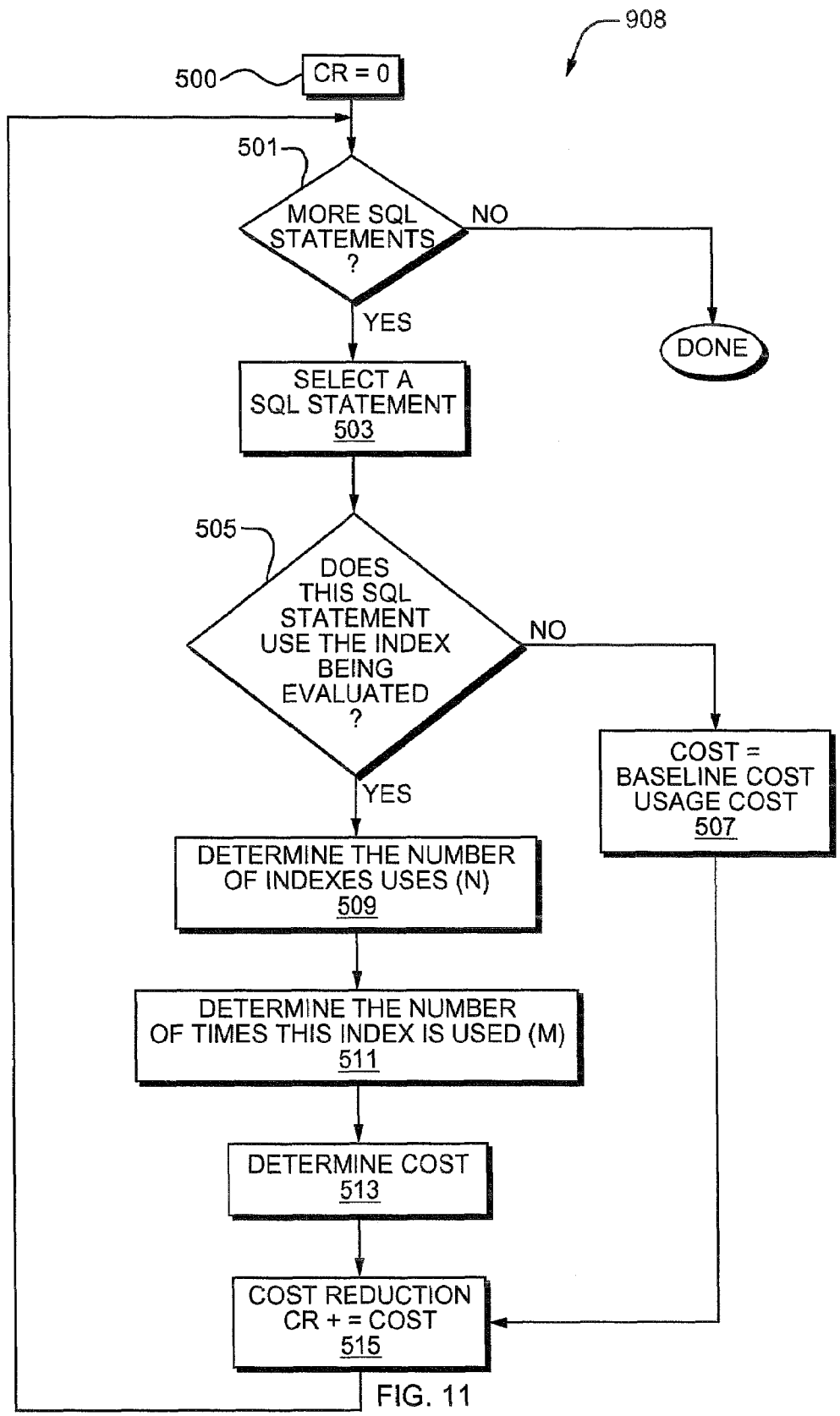
FIG. 11 is a flowchart illustrating an algorithm with which the cost reduction CR, as used in Equation 3, is calculated for a selected index.

FIG. 11 is a flowchart illustrating an algorithm used to calculate the cost reduction CR due to a selected index.

First, at step 500, CR is initialized to 0.

The loop comprising steps 501-515 is repeated until there are no more SQL statements to be processed from the candidate index solution, as determined in step 501.

In step 503, a SQL statement from the workload 4 is selected for processing.

Step 505 determines whether the selected SQL statement uses the index being evaluated. If the SQL statement does not use this index, then step 507 is executed, setting a temporary variable cost to the value held in the UsageCost field 89 of the BaselineCost table 80. Execution then proceeds to step 515, discussed below.

If step 505 determines that the SQL statement does use this index, the flow goes instead to step 509, which determines the total number N of index uses in the execution plan for this SQL statement, i.e., $$N = \sum_{StmtId} \text{IndexReference.IndexRefCount}. \qquad \text{(Eq. 4)}$$

Step 511 determines the number M of times the index being evaluated is used in the execution plan for the selected SQL statement. This is held in the IndexRefCount field 106 of the IndexReference table 100.

Step 513 determines a cost for the selected SQL statement as $$\text{cost} = \left(\text{cost}_{baseline} - M \frac{\text{cost}_{baseline} - \text{cost}_{index}}{N}\right) * X * W \quad \text{(Eq. 5)}$$

where $\text{cost}_{baseline}$ is the cost (field 84) stored in the BaselineCost table 80, $\text{cost}_{index}$ is the cost (field 94) stored in the IndexCost table 90, and X and W are, respectively, the number of executions, from field 86 of the BaselineCost table 80 and the weight, from field 88 of the BaselineCost table 80, as defined previously, all for the corresponding SQL statement.

At step 515, CR is incremented by the amount stored in the temporary variable cost.

Referring back to Equation 3, TC represents the total cost for the baseline. This value is calculated as the sum of all UsageCost 89 values for all SQL statements.

V is the volatility, as calculated by Equation 2 and stored in the IndexMaintenance table 110.

Solution Rollup Evaluator

The solution rollup evaluator 12 determines the "efficiency" of a current or candidate index solution for the entire SQL workload 4. The information stored in the IndexCost 90, IndexMaintenance 110 and IndexRefinement 120 tables contains the raw data needed to populate a single entry in the SollutionRollupTable, described below, for a given index solution. In addition to the "efficiency," various information including the cost of the index solution, the total space requirements for the indexes and the volatility of the index solution are recorded.

Index solutions adhering to user-imposed constraints are presented by the solution rollup evaluator 12, sorted by their "efficiency," to the end user or the index tuning tool. A user-imposed constraint may include conditions such as a maximum number of indexes allowed and/or memory or other storage usage limitations.

FIG. 12 is a schematic diagram illustrating a Solution-Rollup table 130, as used by a particular index validation mechanism. This table 130 comprises five fields: SolutionId 132, Cost 134, SpaceRequired 136, Weight 138 and Usage-Cost 139. The SolutionId field 102 holds an identifier which uniquely identifies the index solution. The Cost field 104 holds the average "weighted cost" for all SQL statements associated with the tables under evaluation 7. This can be calculated simply by summing the UsageCost fields 96 of the IndexCost table 90 for all SQL statements in the workload 4.

The SpaceRequired field 136 holds the number of kilobytes required to create the indexes used at least once. It can be calculated as the sum over the RequiredSpace fields 114 of the IndexMaintenance table 110.

The Volatility field 138 holds a percentage of references to the tables under evaluation 7 that result in any index having to be updated.

The Efficiency field 139 holds an indicator of the overall benefit of the proposed solution. It is calculated as $$\text{Efficiency} = 100 * \left(1 - \frac{\text{cost}_{SolutionRollup}}{\text{cost}_{baselineTotal}}\right) - \text{Volatility} \quad \text{(Eq. 6)}$$

where $\text{cost}_{SolutinRollup}$ is from the Cost field 134 of the SolutionRollup table 130, and where $\text{cost}_{baselineTotal}$, which represents the total cost for the baseline, can be calculated as the sum of all UsageCost fields 89 from the BaselineCost table 80.

Solution Refiner

Figure 13:
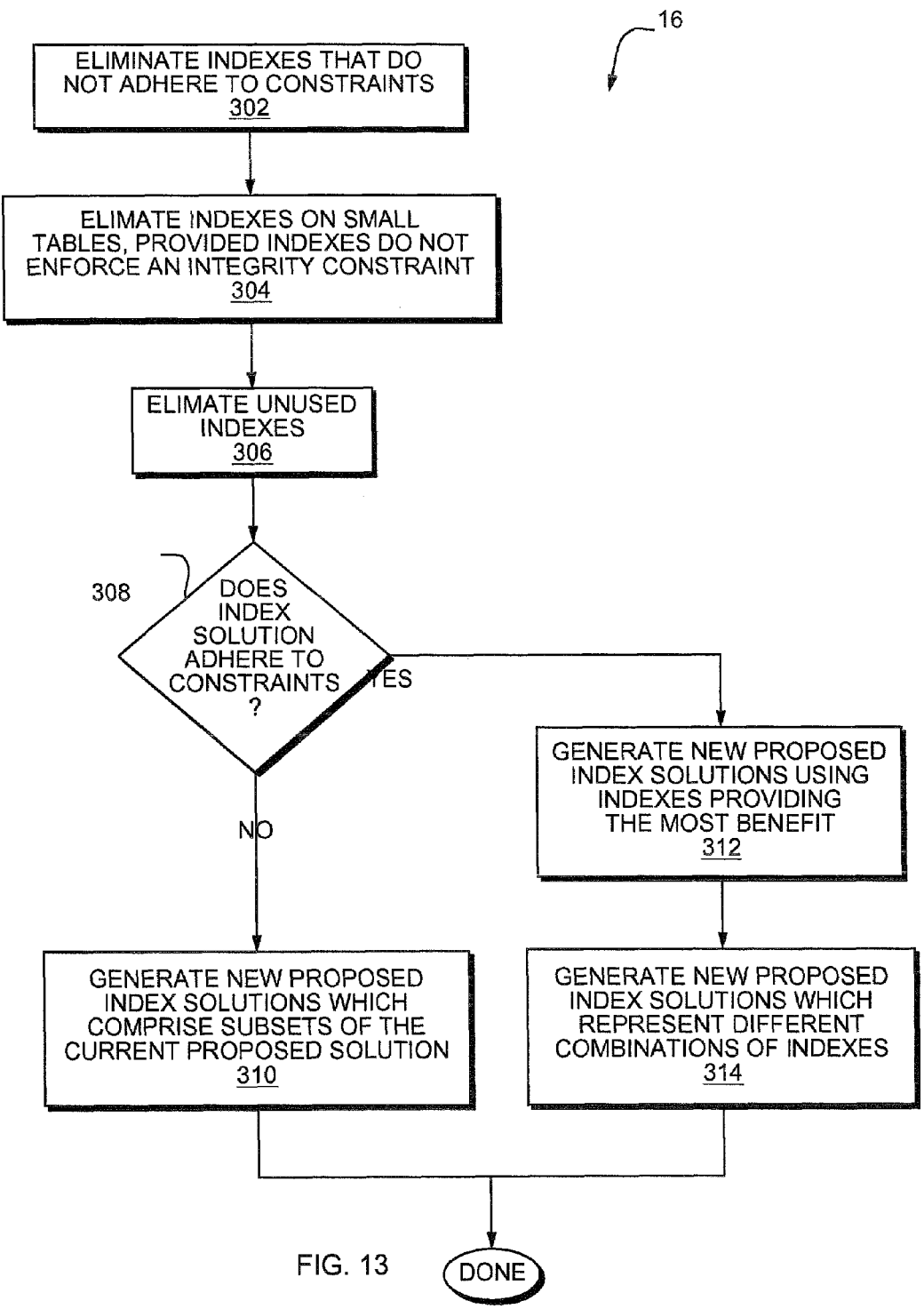
FIG. 13 is a flowchart illustrating the steps executed by an embodiment of the index refiner of FIG. 3C.

FIG. 13 is a flowchart illustrating the steps executed by an embodiment of the index solution refiner 16 of FIG. 3C.

The index solution refiner 16 refines the candidate index solution 5C by generating one or more new proposed index solutions 5A until at least one index solution is found which adheres to user-imposed constraints and no further indexes can be removed without degrading the performance of the SQL workload 4 and without disabling an integrity constraint.

For example, in step 302, the solution refiner 16 eliminates any index or indexes, which do not enforce an integrity constraint, within the current proposed index solution that do not adhere to user-imposed constraints, such as a maximum number of columns allowed in an index.

In step 304, the solution refiner 16 eliminates any indexes on tables under evaluation 7 where the table is sufficiently small that an index would never be a desirable access method, provided that such an index does not enforce an integrity constraint. That is, in accessing data in small tables, a full table scan is always more efficient than using an index access method.

In step 306, the solution refiner 16 further eliminates any indexes within the proposed index solution that are never used, that do not enforce an integrity constraint and whose columns are not the prefix of another index which is being used. For example, if Idx1 is an index on columns Col1, Col2 and Col3 for some table, Idx2 is an index on column Col4, and Idx3 is an index on columns Col1 and Col2, and if Idx2 and Idx3 are not used, the solution refiner 16 can eliminate index Idx2. However, index Idx3 cannot be eliminated because its columns are the same as some of Idx1's columns. This is due to the fact that the Solution Refiner 16 may later eliminate Idx1, and as a result, Idx3 may then be used.

Step 308 determines whether or not the candidate index solution 5C adheres to user-imposed constraints. If it does not adhere to user-imposed constraints, then step 310 follows.

At step 310, one or more new proposed index solutions 5A are generated which represent a subset of the indexes in the current proposed index solution, taking into consideration which user-imposed constraint or constraints were violated.

For example, if the candidate index solution 5C violates a user-imposed constraint that defines the maximum number of indexes allowed, then the one or more indexes that provide the least amount of value can be eliminated to construct a new refined index solution 5A that contains no more than the maximum number of indexes allowed.

As another example, if the candidate index solution violates a user-imposed constraint which defines space usage, then multiple proposed refined index solutions 5A can be constructed which include various combinations of indexes whose space usage requirements adhere to the user-imposed constraint. For each proposed refined index solution, the cycle of FIG. 3C is repeated, starting with the workload evaluator 6 and ending with the solution refiner 16.

As an example, assume a candidate index solution comprises indexes Idx1-Idx4 with usage values and space requirements as shown in Table 1 below. Assume also that index solutions are restricted to a 32 Kb space usage.

TABLE 1

| Index Name | Columns | Usage Value | Required Space |
|---|---|---|---|
| Idx1 | Col1, Col2, Col3 | 100 | 32 |
| Idx2 | Col1, Col2 | 0 | 6 |
| Idx3 | Col1 | 150 | 16 |
| Idx4 | Col4 | 200 | 32 |

In this example, the following proposed refined index solutions might be generated by the solution refiner 16:
  Proposed Refined Solution 1: {Idx4}
  Proposed Refined Solution 2: {Idx1}
  Proposed Refined Solution 3: {Idx2, Idx3}

If, at step 308, it is determined that the candidate index solution does adhere to user-imposed constraints, then steps 312 and 314 are performed instead of step 310.

Step 312 considers natural breaks or gaps in the usage values of each index in the candidate solution to create proposed solutions which include only those indexes providing the most benefit.

Step 314 constructs multiple index solutions that represent the different possible combinations of indexes excluding solutions that include an index that will not used within that solution and whose columns are the prefix of another index which is being used, and excluding solutions that do not include at least one index for each "large" table under evaluation.

For example, assume that a candidate index solution comprises several indexes as shown in Table 2 below:

TABLE 2

| Index Name and Columns | Usage Value |
|---|---|
| I1 (column 1, column 2, column 3) | 200 |
| I2 (column 1, column 2) | 0 |
| I3 (column 4) | 150 |

In this case, the following proposed solutions might be generated:
  Proposed Solution 1: I1
  Proposed Solution 2: I2
  Proposed Solution 3: I3
  Proposed Solution 4: I1, I3
  Proposed Solution 5: I2, I3

A possible solution comprising (I1, I2) is excluded in step 314 because index I2, whose Usage Value is 0, will never be used as long as index I1 is part of the index solution.

EXAMPLE

An example of an embodiment of the present invention is now provided.

Figure 14:
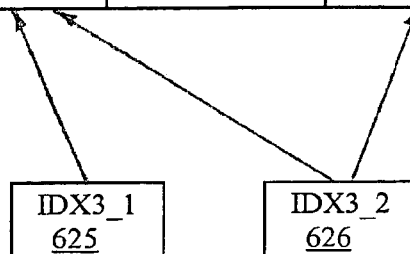
FIG. 14 is a schematic diagram illustrating an exemplary set of four tables and a current index set comprising two indexes.

FIG. 14 is a schematic diagram illustrating an exemplary set of four tables and a current index set comprising two indexes. This example is used in the following discussion. Table TABLE1 600 has five columns COL_1 601 through COL_5 605. Table TABLE2 610 has two columns COL_1 611 and COL_2 612. Table TABLE3 620 has three columns: COL_1 621, COL_2 622 and COL_3 623. Finally, table TABLE4 630 has two columns: COL_1 631 and COL_2 632.

The current index set for this example comprises two indexes: index IDX3_1 625 defined on column COL_1 621 of TABLE3 620 on; and index IDX3_2 626 defined on columns COL_1 621 and COL_3 623 of TABLE3 620.

FIG. 15 is a diagram of a sample workload 650 to be evaluated for the example of FIG. 14. Each of the various SQL statements 651-658, identified respectively as S1-S8, accesses one or more columns from one or more of tables TABLE1 600 through TABLE4 630. For example, statement S1 651 returns the value stored in column COL_4 604 for each row of TABLE1 600 in which column COL_2 602 holds the value For this example, assume that index solutions should weight equally index solutions that improve data access retrieval and index solutions that favor fewer updates to the index. In other words, the constant values defined above with respect to the index solution refiner 16 are K=L=1.

Baseline Analysis Stage

To create a baseline, the workload evaluator 6 first disables existing indexes that do not enforce an integrity constraint (step 452 of FIG. 4), i.e., indexes IDX3_1 and IDX3_2. The workload evaluator 6 then generates execution plans and determines and records execution plan costs of individual SQL workload statements for each statement (steps 456-464).

Figure 16:
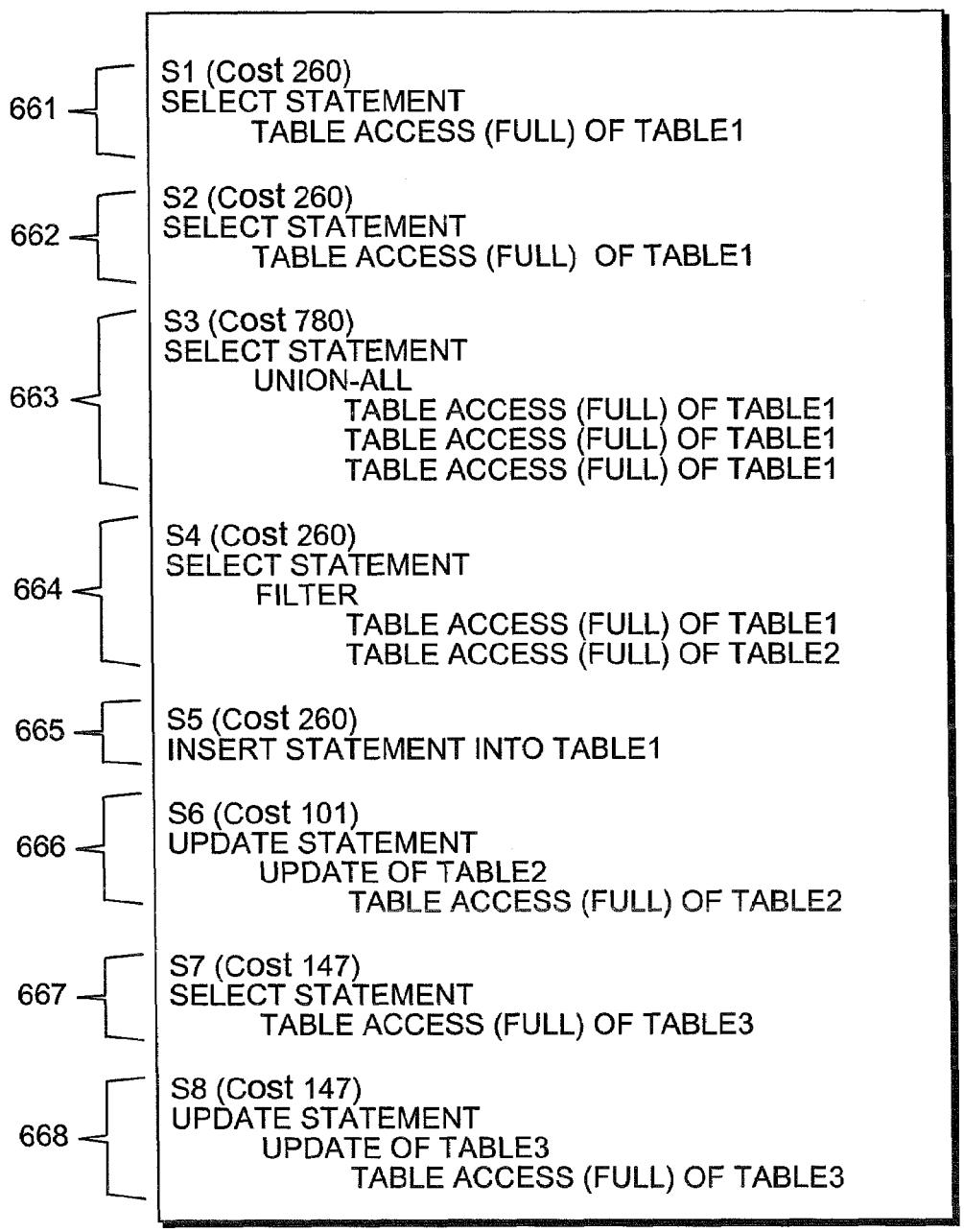
FIG. 16 is an illustration of an evaluation plan for the workload of FIG. 15 for a baseline solution as produced by a particular database index validation mechanism.

FIG. 16 is an illustration of an evaluation plan 660 for workload 650 by a particular database index validation mechanism for a baseline solution. For example, the evaluation 661 for SQL statement S1 651 indicates that a full scan of table TABLE1 will be performed upon execution of statement S1. That is, every row will be examined. Similarly, evaluations 662-668 are shown for statements S2-S8 respectively.

FIG. 17 is a schematic diagram illustrating how the BaselineCost table 80 is populated, for each workload statement, with the execution plan cost 84, the number of executions 86 of the statement within the workload, the user-defined weight 88, and the usage cost 89 as calculated using Equation 1. The number of executions is determined by the workload evaluator 6 from statistics stored, for example, along with the actual SQL text for the workload statement. For this example, the numbers of FIG. 17 have been assumed. Similarly, it is assumed that the given weights have previously been established.

Current Index Set Analysis Stage

Now that the baseline has been established, the indexes in the current index set 2, IDX_1 625 and IDX_2 626 in this example, are evaluated.

First, the workload evaluator 6 reenables the indexes. Execution plans are then generated for the workload statements and the execution plan costs of the individual SQL workload statements are determined.

Figure 18:
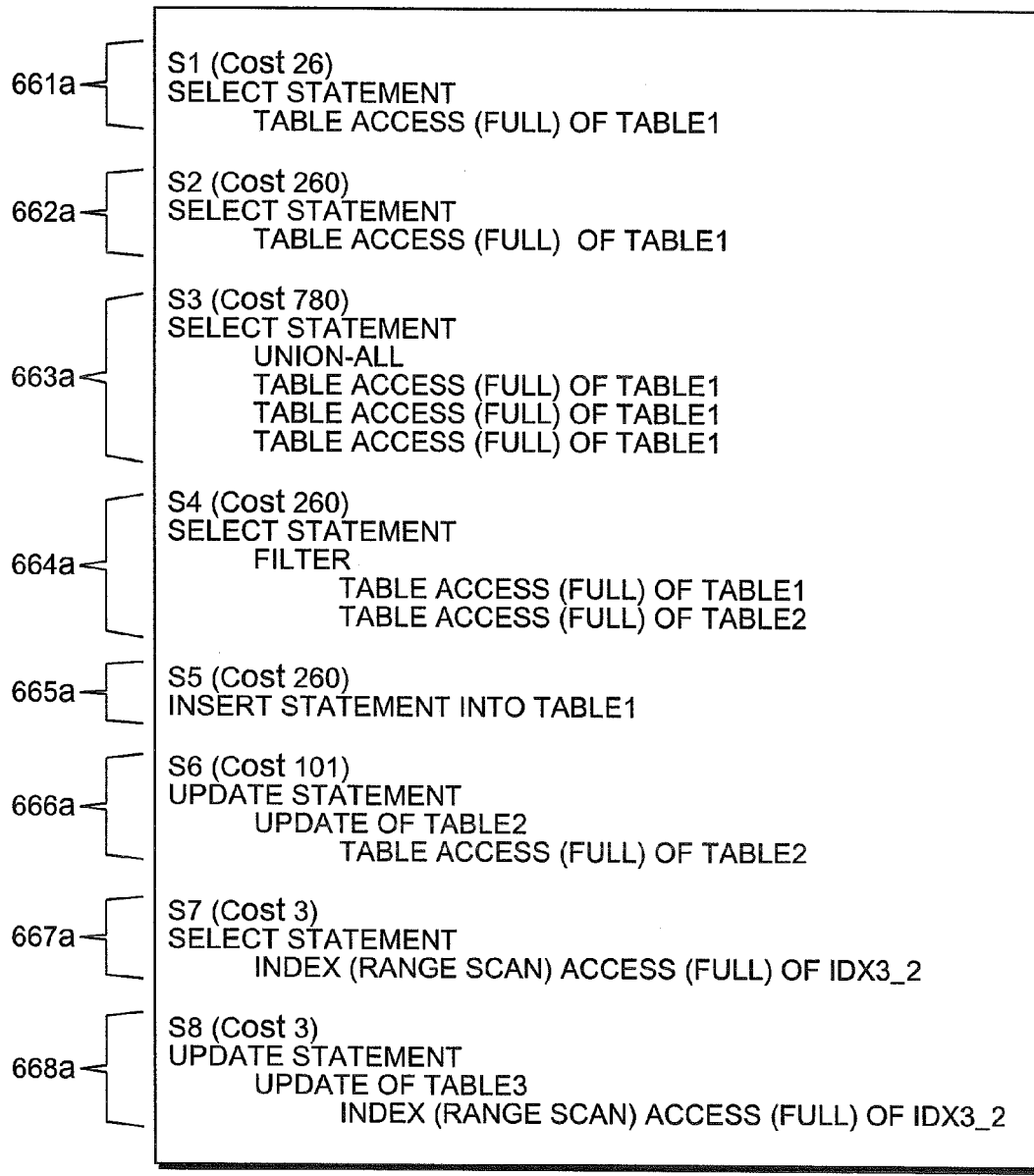
FIG. 18 is an illustration of an evaluation for the workload of FIG. 15 with current indexes enabled.

FIG. 18 is an illustration of an evaluation 660A for workload 650 by a particular database index validation mechanism with the current index set of FIG. 14 enabled. Note that evaluations 661A-666A, corresponding to workload statements S1-S6 respectively, are identical to the baseline evaluations 661-666 of FIG. 16. However, evaluations 667A and 668A, corresponding to workload statements S7 and S8 respectively, now reflect use of the indexes. Note that the cost of each statement S7, S8 has been drastically reduced.

FIG. 19 is a schematic diagram illustrating how the IndexCost table 90 is now populated, for each workload statement, with the execution plan cost 94, and the usage cost 96 as calculated using Equation 2.

FIG. 20 is a schematic diagram illustrating the population of the IndexReference table 100. The IndexRefCount 106 field holds, for each statement using index IDX3_2, the number of times this index is used in the execution plan for that SQL statement. For each of statements S7 and S8, the IndexRefCount is 1.

FIG. 21 is a schematic diagram illustrating the population of the IndexMaintenance table 110 is populated. The space required for each index can be determined by various means which are beyond the scope of the present invention. The volatility for index IDX3_2 is calculated according to Eq. 2 as (50/1260)*100 where there are 50 executions of statement S8, which causes an update to index IDX3_2, and where there are a total of 1260 executions for all statements S1-S8. Note that the volatility for index IDX3_1 is 0, because IDX3_1 is only on table TABLE3, column Col.1, which is not updated by statement S8.

Using the information stored in the BaselineCost 80, IndexCost 90, IndexReference 100 and IndexMaintenance 110 tables, the "value" of each individual index is now determined.

FIG. 22 is a schematic diagram illustrating how the IndexRefinement table 120 is populated. Using Equation 3, the usage value for index IDX3_2 is calculated as $$\left(1 - \frac{CR}{TC}\right) * 100 - V = \left(1 - \frac{225{,}610}{304{,}810}\right) * 100 - 3.97 = 22.03$$

where CR, the cost reduction due to the index has been evaluated, in accordance with FIG. 11 and Equations 4 and 5, as $$13{,}000 + 1{,}300 + 195{,}000 + 13{,}000 + 650 + 1{,}010 +$$
$$\left(147 - \frac{147 - 3}{1}\right) * 500 * 1.0 + \left(147 - \frac{147 - 3}{1}\right) * 50 * 1.0 = 225{,}610$$

and where TC, the baseline total cost is $\Sigma$(BaselineCost.UsageCost)=304,810.

Based on the information stored in the IndexCost 90, IndexReference 100, IndexMaintenance 110 and IndexRefinement 120 tables, the solution rollup evaluator 12 adds an entry comprising the "efficiency" of the candidate index solution to the SolutionRollup table 130 after verifying this solution adheres to user-imposed constraints.

FIG. 23 is a schematic diagram illustrating how the SolutionRollup table 130 is populated.

The cost (field 134) is calculated as $\Sigma$(IndexCost Usage.Cost)=225,610.

The required space (field 136) is calculated as $\Sigma$(IndexMaintenance.RequiredSpace)=14,080.

The volatility (field 138) is calculated as (50/1260)*100=3.97, where $\Sigma$(BaselineCost.Executions)=1260 and a total of 50 executions of statement S8 result in at least one index being updated.

The efficiency (field 139) is calculated, according to Equation 6, as (1–(225610/304,810))*100)–3.97=22.03.

Proposed Index Solution Analysis

Now, a new proposed index set is generated, either manually by a user, or by a special software tool, as mentioned previously. Assume for this example that the new proposed index set contains the following indexes:

IDX1_1 on TABLE1's columnCOL_2;
IDX1_2 on TABLE1's columns COL_2, COL_3 and COL_1;
IDX2_1 on TABLE2's column COL_1; and
IDX2_2 on TABLE2's column COL_2.

These proposed indexes, along with the indexes from the current index set, i.e., IDX3_1 and IDX3_2, form the proposed index superset 5 (FIG. 3C) to be considered as the first candidate index solution, Solution 1, by the database server.

Execution plans are then generated for this new candidate Solution 1, and execution plan costs of individual SQL workload statements are determined.

Figure 24:
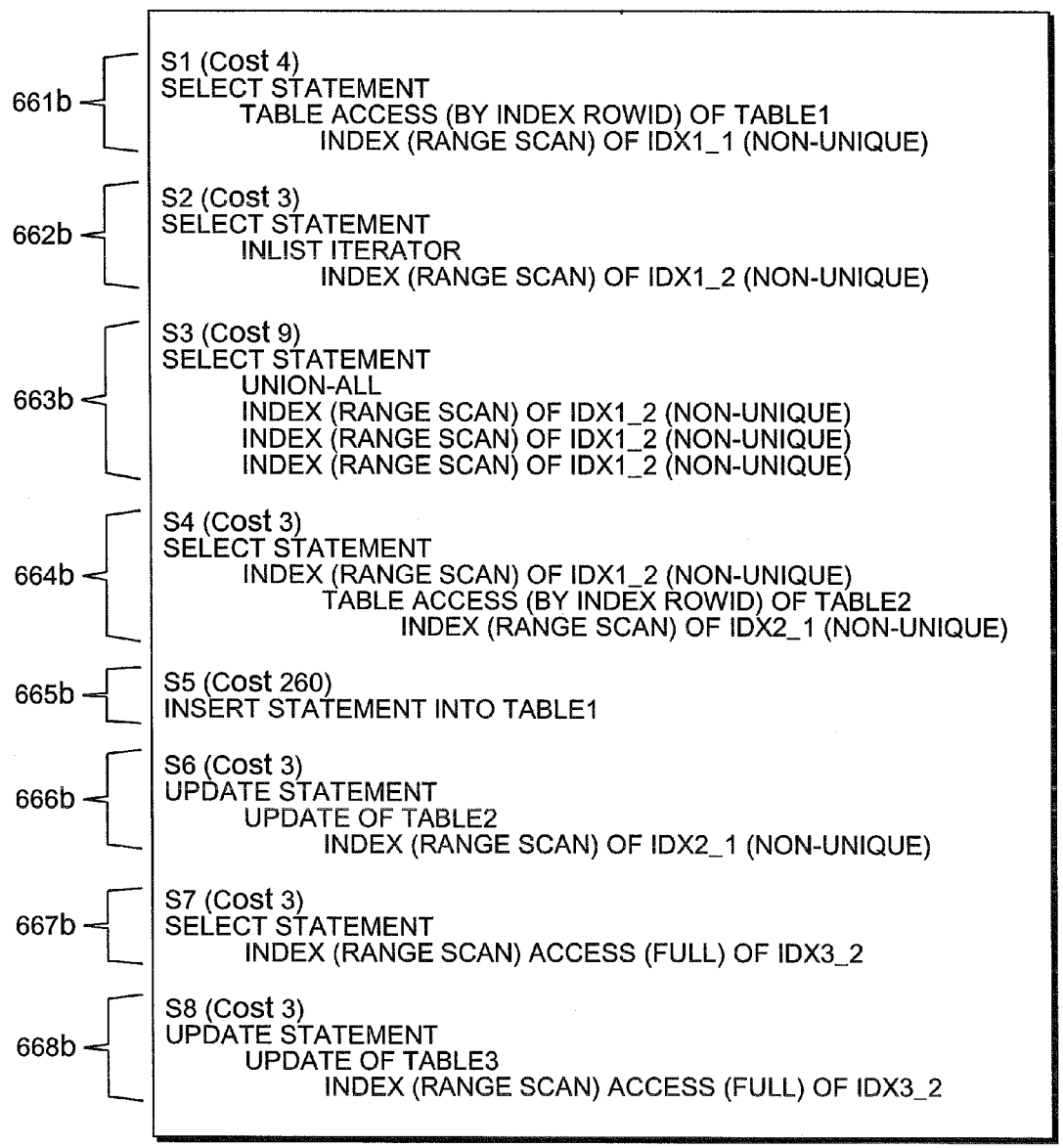
FIG. 24 is an illustration of an evaluation for the workload of FIG. 15 for an exemplary proposed solution index set.

FIG. 24 is an illustration of an evaluation 660A for workload 650 by a particular database index validation mechanism for the proposed Solution 1 index set. As a result of the new indexes, the costs of statements S1-S4 and S6 have been greatly reduced, as indicated by the respective evaluations 661B-664B and 666B.

Execution plan costs for each SQL statement, as well as index usage and maintenance information, are recorded in the IndexCost, IndexReference and IndexMaintenance tables, 80, 90 and 100 respectively.

FIGS. 25-27 are schematic diagrams illustrating how the IndexCost table 90, the IndexReference table 100 and the IndexMaintenance table 110 are populated as a result of the new proposed index solution.

Volatility for each of indexes IDX1_1 and IDX1_2 is calculated as (10/1260)*100=0.79, where there are 1,260 total statement executions and 10 statement executions for statement S5 result in index IDX1_1 and IDX1_2 being updated.

Volatility for index IDX2_1 is calculated as (40/1260)*100=3.17 where there are 1,260 total statement executions, and 40 statement executions for statement S6 which result in index IDX2_1 being updated.

Volatility for IDX3_2 is calculated as (50/1260)*100=3.97 where 50 statement executions for statement S8 result in index IDX3_1 being updated.

Using the information stored in IndexCost 90, IndexReference 100, IndexMaintenance 110 and BaselineCost 80 tables, the index evaluator 9 determines the "value" of the individual indexes.

FIG. 28 is a schematic diagram illustrating the population of the IndexRefinement table 120 with these new usage values.

The usage value for index IDX1_1 is calculated as follows. First, the cost reduction due to TABLE1 is $$CR_{IDX1\_1} = \left(260 - \left(\frac{260 - 4}{1}\right) * 1 * 50 * 1.0\right) + 1{,}300 +$$
$$195{,}000 + 13{,}000 + 650 + 1{,}010 + 73{,}500 + 350 = 292{,}010$$

The total baseline cost is TC=$\Sigma$(BaselineCost.UsageCost) =304,810. The usage value for IDX1_1 is thus $$\left(1 - \frac{292{,}010}{304{,}810}\right) * 100 - 0.79 = 3.41$$

The usage value of index IDX1_2 is calculated similarly:

$$CR_{IDX1\_2} = 13{,}000 + \left(260 - \left(\frac{260 - 3}{1}\right) * 1 * 10 * 0.5\right) +$$
$$\left(780 - \left(\frac{780 - 9}{3}\right) * 3 * 500 * 0.5\right) + \left(260 - \left(\frac{160 - 3}{2}\right) * 1 * 10 * 0.5\right) +$$
$$650 + 1{,}010 + 35{,}000 + 7{,}350 = 98{,}432$$

The usage value for index IDX1_2 is therefore $$\left(1 - \frac{98,432}{304,810}\right) * 100 - 0.79 = 66.91$$

Similarly, $$CR_{IDX2\_1} =$$
$$13,000 + 1,300 + 195,000 + \left(260 - \left(\frac{160-3}{2}\right) * 1 * 100 * 0.5\right) + 650 +$$
$$\left(101 - \left(\frac{101-3}{1}\right) * 1 * 40 * 0.25\right) + 73,500 + 7,350 = 291,487$$

The usage value of index IDX2_1 is $$\left(1 - \frac{191,487}{304,810}\right) * 100 - 3.17 = 1.23.$$

Finally, $$CR_{IDX3\_2} = 13,000 + 1,300 + 195,000 +$$
$$650 + 1,010 + \left(147 - \left(\frac{147-3}{1}\right) * 1 * 500 * 1.0\right) +$$
$$\left(147 - \left(\frac{147-1}{1}\right) * 1 * 50 * 1.0\right) = 225,610$$

and the usage value of index IDX3_2 is $$\left(1 - \frac{225,610}{304,810}\right) * 100 - 3.97 = 22.03.$$

Using the information stored in the IndexCost 90, IndexReference 100 and IndexMaintenance 110 tables, the solution rollup evaluator 16 adds an entry in the Solution-Rollup table for the "efficiency" of the candidate Solution 1 after verifying that the solution adheres to user-imposed constraints.

FIG. 29 is a schematic diagram illustrating the Solution-Rollup table 120 as it is now populated.

The cost is calculated as Σ(IndexCost.UsageCost).

The required space is Σ(IndexMaintenance.RequiredSpace),

The volatility for Solution 1 is calculated as 1260 total statement executions of which 100 statement executions (S5, S6, S8) result in at least one index being updated: (100/1260)*100=7.9.

The efficiency for Solution 1 is calculated, according to Equation 6 as ((1−(4,945/304,810)*100)−7.9=90.5

Solution Refinement Phase

Using the information stored in the IndexRefinement table 120, the solution refiner 16 refines the proposed index solution by generating one or more proposed index solutions.

First, any indexes within Solution 1 that do not adhere to user-imposed constraints; for example, a constraint that defines the maximum number of columns allowed in an index, are eliminated. For this example, assume all indexes adhere to user-imposed constraints.

Second, any index within the Index Solution that is never used, does not enforce an integrity constraint and whose columns are not the prefix of another index which is being used, is eliminated. In this example, IDX2_2 and IDX3_1 are never used.

However, only IDX2_2 can be eliminated. IDX3_1 cannot be eliminated because it is a prefix of IDX3_2, which is used.

Table 3 below compares the UsageValues of the indexes. Natural breaks become apparent which define several groups of indexes.

TABLE 3

| Group | Index | Usage Value |
|---|---|---|
| 1 | IDX3_1 | 0 |
| 2 | IDX1_1 | 3.14 |
|   | IDX2_1 | 1.23 |
| 3 | IDX3_2 | 22.03 |
| 4 | IDX1_2 | 66.9 |

One possible proposal is to include only those indexes providing the most benefit; for example, a solution proposing IDX1_2 and IDX3_2.

Other possible proposals could comprise the different possible combinations of indexes excluding indexes those that are used but that encompass another index's columns. For example, indexes IDX1_2 and IDX3_3 have the highest usage values, yet because IDX1_1's indexed columns are also the prefix of the indexed columns for IDX1_2, it is likely that any index access satisfied by IDX1_2 will also be satisfied by Obviously, there is a chance that data retrieval performance may suffer by excluding the encompassing index, i.e., index IDX1_2. However, the performance degradation may be acceptable, especially considering space usage requirements will be less and the solution volatility may be smaller. The following refined solutions provide access to each of tables TABLE1, TABLE2 and TABLE3 through at least one index, but each refined solution exclude at least one index from the original proposed index solution 5:

Proposed Refined Solution: {IDX1_2, IDX2_1, IDX3_1}
Proposed Refined Solution: {IDX1_2, IDX2_1, IDX3_1, IDX3_2}
Proposed Refined Solution: {IDX1_1, IDX2_1, IDX3_2}
Proposed Refined Solution: {IDX1_1, IDX2_1, IDX3_1}
Proposed Refined Solution: {IDX1_1, IDX2_1, IDX3_1, IDX3_2}
Proposed Refined Solution: {IDX1_1, IDX1_2, IDX2_1 IDX3_2}
Proposed Refined Solution: {IDX1_1, IDX1_2, IDX2_1 IDX3_1}

These refined solutions 5A (FIG. 3C) are then passed back to the workload evaluator 6, one solution at a time, for a determination as to whether a newly proposed index solution may not in fact be the best one.

It will be apparent to those of ordinary skill in the art realize that methods involved in the present system for evaluating indexes may be embodied in a computer program product that includes a computer-usable medium. For example, a computer usable medium can include a readable memory device, such as a hard drive device, a CD-ROM, a DVD-ROM, or a computer diskette, having computer readable program code segments stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for evaluating a plurality of candidate index sets for a workload of database statements in a database system, the method comprising:
    forming an index superset from a union of a current index set and a proposed index set;
    deriving a candidate index set from the index superset, the derived candidate index set being incorporated into the plurality of candidate index sets;
    analyzing collected database statistics based on the derived candidate index set;
    repeatedly deriving a candidate index set and analyzing collected statistics based on the proposed index set;
    terminating the repeated execution when at least one candidate index solution is found that adheres to user-imposed constraints and no further indexes can be removed from said candidate index solution without degrading performance of the workload and without disabling an integrity constraint, wherein the integrity constraint describes a condition about the database that must always be true or must always be false; and
    presenting the analyzed collected statistics.

2. The method of claim 1, further comprising:
    deriving current index statistics for the workload responsive to the current index set, the presented collected statistics comprising the derived current index statistics.

3. The method of claim 1, wherein analyzing statistics for a statement comprises generating at least one statistic based on an execution plan created by an optimizer.

4. The method of claim 3, wherein the execution plan is based on available access paths.

5. The method of claim 3, wherein the execution plan is based on statistics for at least one schema object accessed by the statement.

6. The method of claim 5 wherein the at least one schema object is a table.

7. The method of claim 5 wherein the at least one schema object is an index.

8. The method of claim 3, further comprising:
    for a table accessed by a statement under evaluation, using the execution plan to identify at least one index that would be used to retrieve data from the table upon an execution of the statement.

9. The method of claim 3, wherein the optimizer generates a cost of the execution plan.

10. The method of claim 9, wherein the cost of the execution plan is derived from a resource use needed to execute the statement according to the execution plan.

11. The method of claim 10, wherein the resource use includes CPU execution time.

12. The method of claim 10, wherein the resource use includes input/output access.

13. The method of claim 3, wherein the collected database statistics comprise the number of executions of the statement.

14. The method of claim 3, wherein the collected database statistics comprise a user-defined importance of the statement.

15. The method of claim 3, wherein the collected database statistics comprise an index usage.

16. The method of claim 1, wherein the statements are SQL statements.

17. The method of claim 1, wherein the workload is reduced into unique statements.

18. The method of claim 1, wherein deriving a candidate index set is responsive to a predetermined maximum number of allowed indexes.

19. The method of claim 1, wherein deriving a candidate index set is responsive to available storage space.

20. The method of claim 1, wherein the proposed index set is provided by a user.

21. The method of claim 1, wherein the proposed index set is provided by an expert system.

22. The method of claim 1, wherein an execution plan is created without creating indexes which are not in the current index set.

23. The method of claim 1, wherein the statistics include index volatility.

24. The method of claim 1, further comprising:
    generating baseline statistics for each statement in the workload, wherein generating statistics is additionally based on the baseline statistics.

25. The method of claim 24, wherein analyzing the collected baseline statistics comprises disabling current indexes.

26. The method of claim 1 wherein terminating comprises:
    terminating the repeated execution when at least one candidate index solution is found that adheres to user-imposed constraints and no further indexes can be removed from said candidate index solution without degrading performance of the workload and without disabling an integrity constraint, wherein the integrity constraint describes a condition about the database that must always be true or must always be false, and wherein any removed index that does not enforce an integrity constraint is disabled.

27. A system for evaluating a plurality of candidate index sets for a workload in a database system, the workload derived from a plurality of statements, the system comprising:
    a workload evaluator, including a processor, wherein the workload evaluator evaluates each statement within the workload using collected database statistics;
    an index solution evaluator which, responsive to the workload evaluator, evaluates each index in a candidate index set with respect to the workload, the candidate index solution being one of the plurality of candidate index sets, each candidate index set derived from an index superset formed by the union of a current index set and a proposed index set;
    a solution/rollup evaluator which, responsive to the index solution evaluator, evaluates the candidate index solution; and
    a solution refiner which, responsive to the solution/rollup evaluator, generates at least one new candidate index solution, the at least one new candidate index solution being incorporated into the plurality of candidate index sets, wherein the solution refiner further generates at least one new candidate index solution by eliminating at least one index on a small table under evaluation, wherein the at least one index does not enforce an integrity constraint, wherein the integrity constraint describes a condition about the database that must always be true or must always be false.

28. The system of claim 27, wherein the solution refiner generates at least one new candidate index solution by eliminating at least one index within the candidate index solution that does not adhere to user-imposed constraints.

29. The system of claim 28, wherein the constraint is a user-defined constraint.

30. The system of claim 28, wherein the constraint is a memory-usage constraint.

31. The system of claim 27, wherein the workload evaluator evaluates an execution plan created by an optimizer, the execution plan comprising, for each statement of the workload, an execution plan which represents a series of steps for executing the statement, the workload evaluator further generating and recording statistics based on the evaluation of the execution plan.

32. The system of claim 31, wherein each execution plan is created based on available access paths.

33. The system of claim 31, wherein each execution plan is created based on statistics for at least one schema object accessed by the statement.

34. The system of claim 33 wherein the at least one schema object is a table.

35. The system of claim 33 wherein the at least one schema object is an index.

36. The system of claim 31, wherein the workload evaluator, for a table accessed by a statement under evaluation, identifies at least one index which would be used to retrieve data from the table upon an execution of the statement.

37. The system of claim 31, wherein the workload evaluator determines a cost of the execution plan.

38. The system of claim 37, wherein the cost of the execution plan is derived from a resource use needed to execute the statement according to the execution plan.

39. The system of claim 38, wherein the resource use includes CPU execution time.

40. The system of claim 38, wherein the resource use includes input/output access.

41. The system of claim 31, wherein the statistics include the number of executions of the statement.

42. The system of claim 31, wherein the statistics include a user-defined importance of the statement.

43. The system of claim 31, wherein the statistics include an index usage.

44. The system of claim 31, wherein the statistics include a cost of the execution plan.

45. The system of claim 31, wherein the statistics include index volatility.

46. The system of claim 27, wherein the statements are SQL statements.

47. The system of claim 27, wherein the workload is reduced into unique statements.

48. The system of claim 27, wherein the solution refiner is responsive to a predetermined maximum number of allowed indexes.

49. The system of claim 27, wherein the solution refiner is responsive to available storage space.

50. The system of claim 27, wherein the proposed index set is provided by a user.

51. The system of claim 27, wherein the proposed index set is provided by an expert system.

52. The system of claim 27, wherein an execution plan is created without creating indexes which are not in the current index set.

53. The system of claim 27 wherein a solution refiner comprises:
a solution refiner which, responsive to the solution/rollup evaluator, generates at least one new candidate index solution, the at least one new candidate index solution being incorporated into the plurality of candidate index sets, wherein the solution refiner further generates at least one new candidate index solution by eliminating at least one index on a small table under evaluation, wherein the at least one index does not enforce an integrity constraint, wherein the integrity constraint describes a condition about the database that must always be true or must always be false, and wherein any eliminated index that does not enforce an integrity constraint is disabled.

54. A computer program product for evaluating a plurality of candidate index sets for a workload of database statements in a database system, the computer program product comprising a computer usable medium having computer readable code thereon, including program code which:
forms an index superset from a union of a current index set and a proposed index set;
repeatedly derives a candidate index set from the index superset, the derived candidate index set being incorporated into the plurality of candidate index sets, generates statistics based on the proposed index set, and analyzes collected database statistics based on the derived candidate index set;
terminates the repeated execution when at least one candidate index solution is found that adheres to user-imposed constraints and no further indexes can be removed from said candidate index solution without degrading performance of the workload and without disabling an integrity constraint, wherein the integrity constraint describes a condition about the database that must always be true or must always be false; and
presents the analyzed statistics.

55. The computer program product of claim 54, further comprising code which:
derives current index statistics for the workload responsive to the current index set, the presented analyzed statistics comprising the derived current index statistics.

56. The computer program product of claim 54, wherein the statistics include index volatility.

57. The computer program product of claim 54, further comprising code which:
derives baseline statistics for each statement in the workload, wherein deriving statistics is additionally based on the baseline statistics.

58. The computer program product of claim 57, wherein deriving the baseline statistics comprises disabling current indexes.

59. The computer program product of claim 54, wherein statistics for a statement are derived by generating at least one statistic based on an execution plan created by an optimizer.

60. The computer program product of claim 59, wherein the execution plan is based on available access paths.

61. The computer program product of claim 59, wherein the execution plan is based on statistics for at least one schema object accessed by the statement.

62. The computer program product of claim 61 wherein the at least one schema object is a table.

63. The computer program product of claim 61 wherein the at least one schema object is an index.

64. The computer program product of claim 59, further comprising code which:
for a table accessed by a statement under evaluation, uses the execution plan to identify at least one index that would be used to retrieve data from the table upon an execution of the statement.

65. The computer program product of claim 59, wherein the optimizer generates a cost of the execution plan.

66. The computer program product of claim 65, wherein the cost of the execution plan is derived from a resource use needed to execute the statement according to the execution plan.

67. The computer program product of claim 66, wherein the resource use comprises CPU execution time.

68. The computer program product of claim 66, wherein the resource use comprises input/output access.

69. The computer program product of claim 59, wherein the statistics comprise the number of executions of the statement.

70. The computer program product of claim 59, wherein the statistics comprise a user-defined importance of the statement.

71. The computer program product of claim 59, wherein the statistics comprise an index usage.

72. The computer program product of claim 54, wherein the statements are SQL statements.

73. The computer program product of claim 54, wherein the workload is reduced into unique statements.

74. The computer program product of claim 54, wherein a candidate index set is derived responsive to a predetermined maximum number of allowed indexes.

75. The computer program product of claim 54, wherein deriving a candidate index set is responsive to available storage space.

76. The computer program product of claim 54, wherein the proposed index set is provided by a user.

77. The computer program product of claim 54, wherein the proposed index set is provided by an expert system.

78. The computer program product of claim 54, wherein an execution plan is created without creating indexes which are not in the current index set.

79. The computer program product of claim 54 wherein program code which terminates comprises:
    terminates the repeated execution when at least one candidate index solution is found that adheres to user-imposed constraints and no further indexes can be removed from said candidate index solution without degrading performance of the workload and without disabling an integrity constraint, wherein the integrity constraint describes a condition about the database that must always be true or must always be false, and wherein any removed index that does not enforce an integrity constraint is disabled.

80. A system for evaluating a plurality of candidate index sets for a workload of database statements in a database system, comprising:
    means for forming an index superset from a union of a current index set and a proposed index set, wherein the means include a processor;
    means for deriving a candidate index set from the index superset, the derived candidate index set being incorporated into the plurality of candidate index sets;
    means for analyzing collected database statistics based on the derived candidate index set;
    means for repeatedly deriving a candidate index set and generating statistics based on the proposed index set;
    means for terminating the repeated execution when at least one candidate index solution is found that adheres to user-imposed constraints and no further indexes can be removed from said candidate index solution without degrading performance of the workload and without disabling an integrity constraint, wherein the integrity constraint describes a condition about the database that must always be true or must always be false; and
    means for presenting the analyzed statistics.

81. The system of claim 80, further comprising:
    means for generating current index statistics for the workload responsive to the current index set, the presented generated statistics comprising the generated current index statistics.

82. The system of claim 80, wherein the statistics include index volatility.

83. The system of claim 80, further comprising:
    means for generating baseline statistics for each statement in the workload, wherein statistics are generated based additionally on the baseline statistics.

84. The system of claim 83, wherein analyzing the baseline statistics comprises disabling current indexes.

85. The system of claim 80, wherein analyzing statistics for a statement comprises generating at least one statistic based on an execution plan created by an optimizer.

86. The system of claim 85, wherein the execution plan is based on available access paths.

87. The system of claim 85, wherein the execution plan is based on statistics for at least one schema object accessed by the statement.

88. The system of claim 87 wherein the at least one schema object is a table.

89. The system of claim 87 wherein the at least one schema object is an index.

90. The system of claim 85, further comprising:
    means for using, for a table accessed by a statement under evaluation, the execution plan to identify at least one index that would be used to retrieve data from the table upon an execution of the statement.

91. The system of claim 85, wherein the optimizer generates a cost of the execution plan.

92. The system of claim 91, wherein the cost of the execution plan is derived from a resource use needed to execute the statement according to the execution plan.

93. The system of claim 92, wherein the resource use comprises CPU execution time.

94. The system of claim 92, wherein the resource use comprises input/output access.

95. The system of claim 85, wherein the statistics comprise the number of executions of the statement.

96. The system of claim 85, wherein the statistics comprise a user-defined importance of the statement.

97. The system of claim 85, wherein the statistics comprise an index usage.

98. The system of claim 80, wherein the statements are SQL statements.

99. The system of claim 80, wherein the workload is reduced into unique statements.

100. The system of claim 80, wherein deriving a candidate index set is responsive to a predetermined maximum number of allowed indexes.

101. The system of claim 80, wherein deriving a candidate index set is responsive to available storage space.

102. The system of claim 80, wherein the proposed index set is provided by a user.

103. The system of claim 80, wherein the proposed index set is provided by an expert system.

104. The system of claim 80, wherein an execution plan is created without creating indexes which are not in the current index set.

105. The system of claim 80 wherein means for terminating comprises:

means for terminating the repeated execution when at least one candidate index solution is found that adheres to user-imposed constraints and no further indexes can be removed from said candidate index solution without degrading performance of the workload and without disabling an integrity constraint, wherein the integrity constraint describes a condition about the database that must always be true or must always be false, and wherein any removed index that does not enforce an integrity constraint is disabled.

* * * * *